US012475699B1

(12) United States Patent
Parker et al.

(10) Patent No.: US 12,475,699 B1
(45) Date of Patent: Nov. 18, 2025

(54) USER INTERFACE FOR CONTEXTUAL VALIDATION OF RECOGNIZED TEXT

(71) Applicant: Block, Inc., Oakland, CA (US)

(72) Inventors: Philip Parker, Chester, SC (US); Patrick Fink, Matthews, NC (US)

(73) Assignee: Block, Inc., Oakland, CA (US)

( * ) Notice: Subject to any disclaimer, the term of this patent is extended or adjusted under 35 U.S.C. 154(b) by 409 days.

(21) Appl. No.: 18/079,701

(22) Filed: Dec. 12, 2022

(51) Int. Cl.
*G06F 40/174* (2020.01)
*G06K 9/00* (2022.01)
*G06K 9/34* (2006.01)
*G06V 10/94* (2022.01)
*G06V 30/19* (2022.01)
*G06V 30/413* (2022.01)
*G06V 30/414* (2022.01)
*G06V 30/42* (2022.01)

(52) U.S. Cl.
CPC .......... *G06V 10/945* (2022.01); *G06F 40/174* (2020.01); *G06V 30/1916* (2022.01); *G06V 30/413* (2022.01); *G06V 30/414* (2022.01); *G06V 30/42* (2022.01)

(58) Field of Classification Search
None
See application file for complete search history.

(56) References Cited

U.S. PATENT DOCUMENTS

| 11,182,544 B2 | 11/2021 | Roebuck | |
| 2020/0081967 A1 * | 3/2020 | Roebuck | G06V 10/945 |
| 2021/0406716 A1 * | 12/2021 | Broyles | G06F 16/2379 |

* cited by examiner

Primary Examiner — Andrew H Lam
(74) Attorney, Agent, or Firm — Lee & Hayes, P.C.

(57) ABSTRACT

Implementing a user interface for contextual validation of recognized text is described. A server may receive image data representing a document, determine, based at least in part on the image data, a type of the document, recognize a text element included in a portion of the document, and determine a point in a data validation process that is associated with the type of the document and/or determine an electronic form that is associated with the type of the document. The server may further cause a user interface to be displayed via an application executing on an electronic device, wherein the user interface presents: (i) an image of the portion of the document adjacent to a field populated with the text element; and (ii) at least one interactive element that, upon selection, indicates that a user of the electronic device validates the text element within the field.

20 Claims, 12 Drawing Sheets

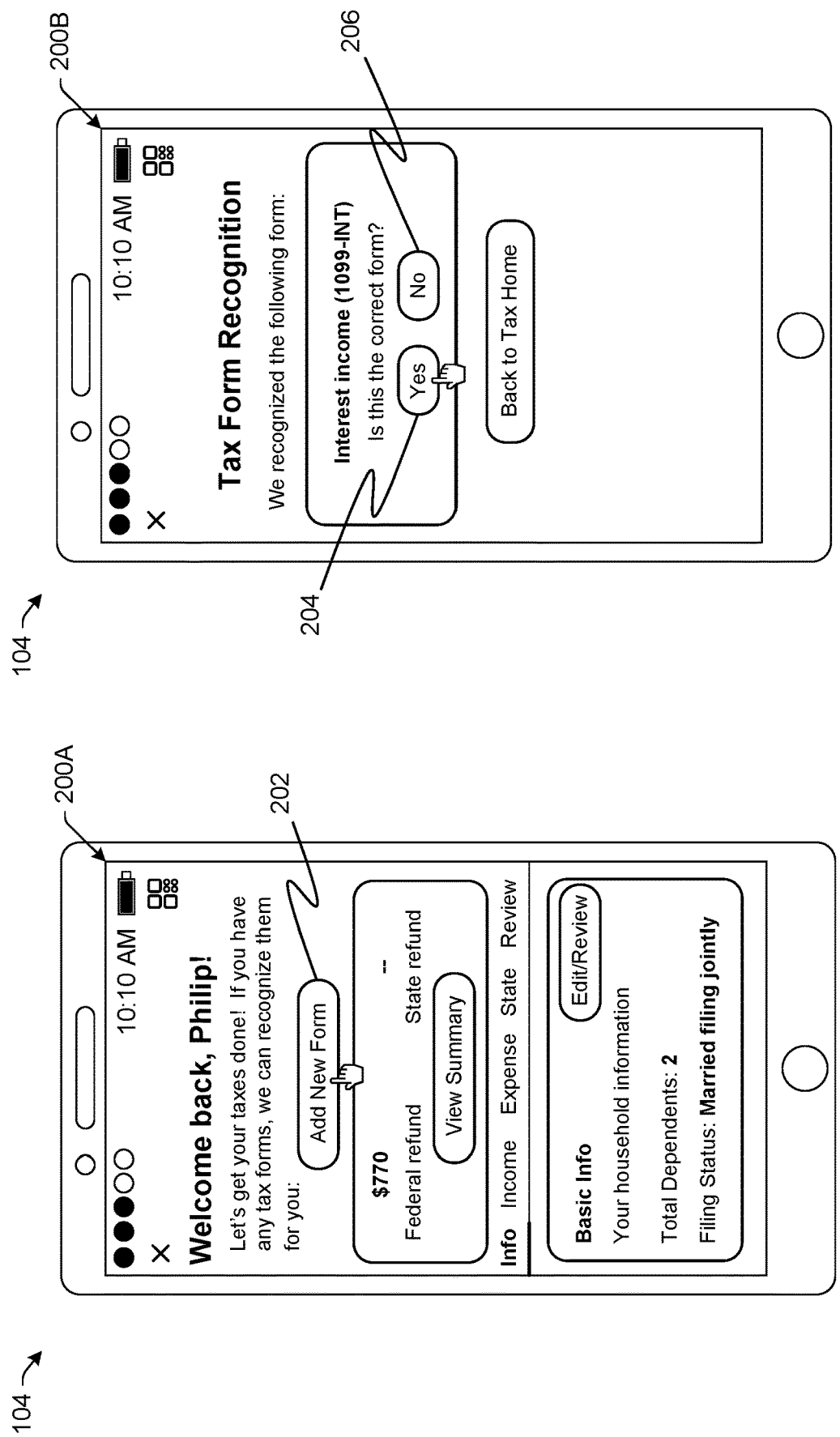

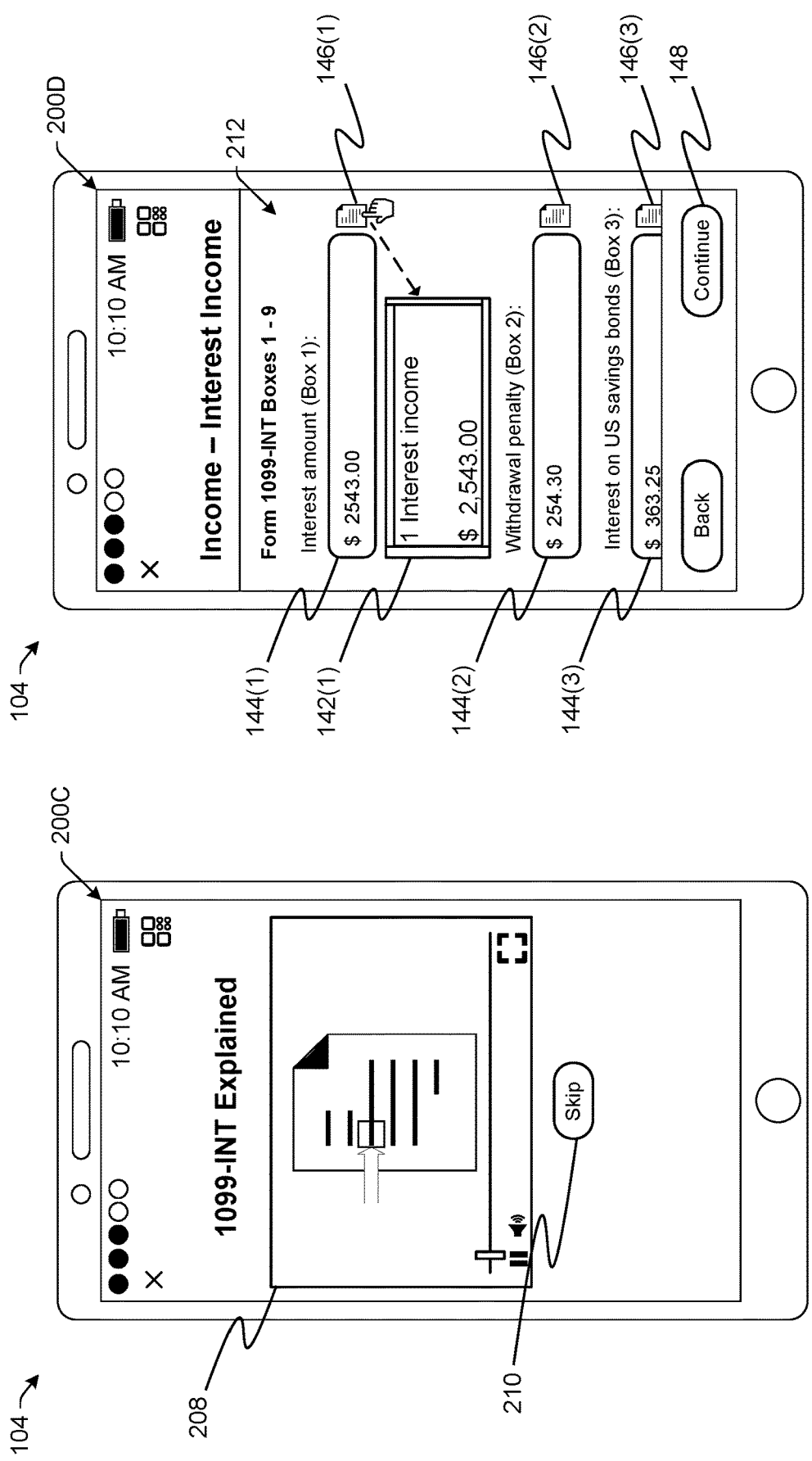

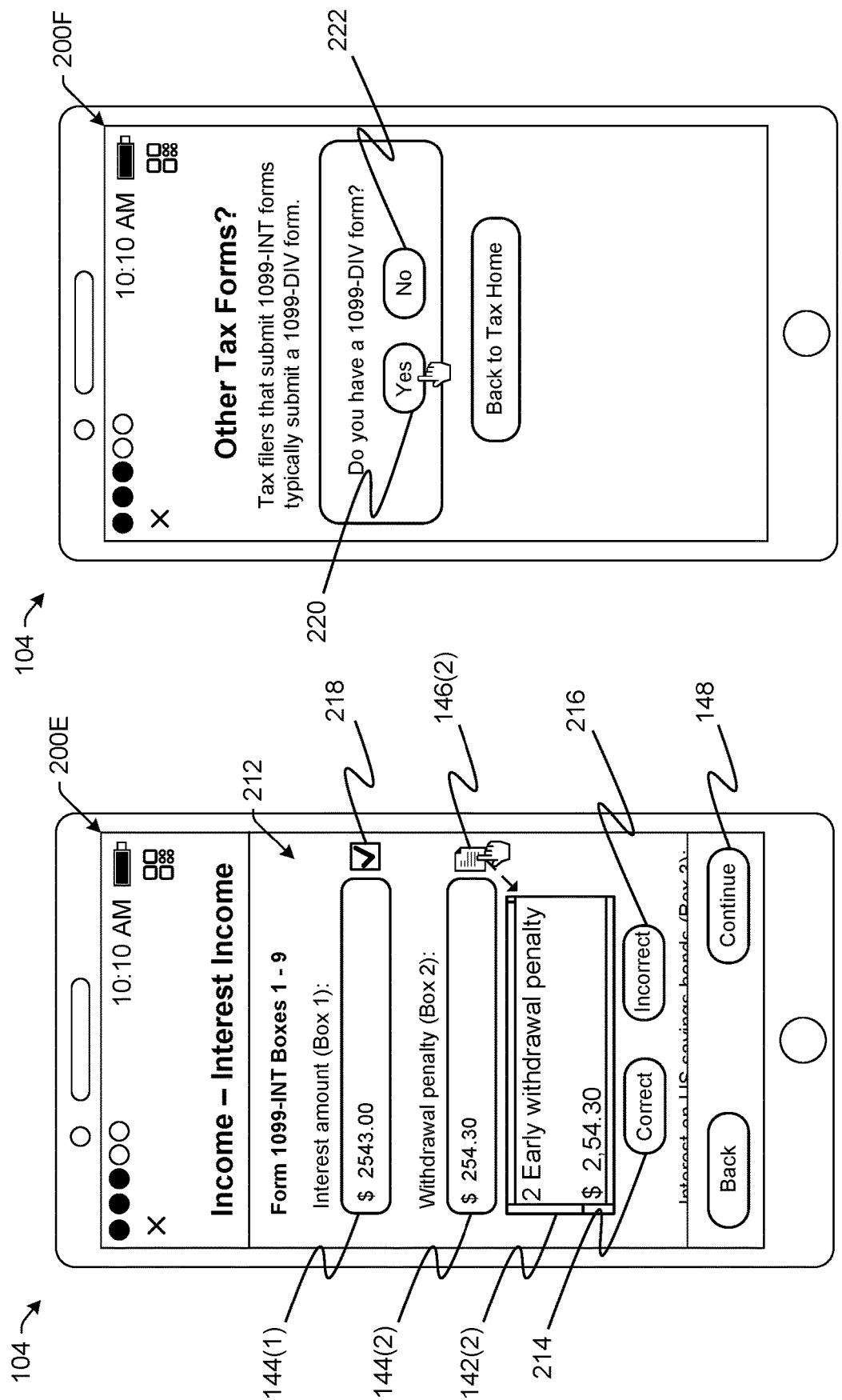

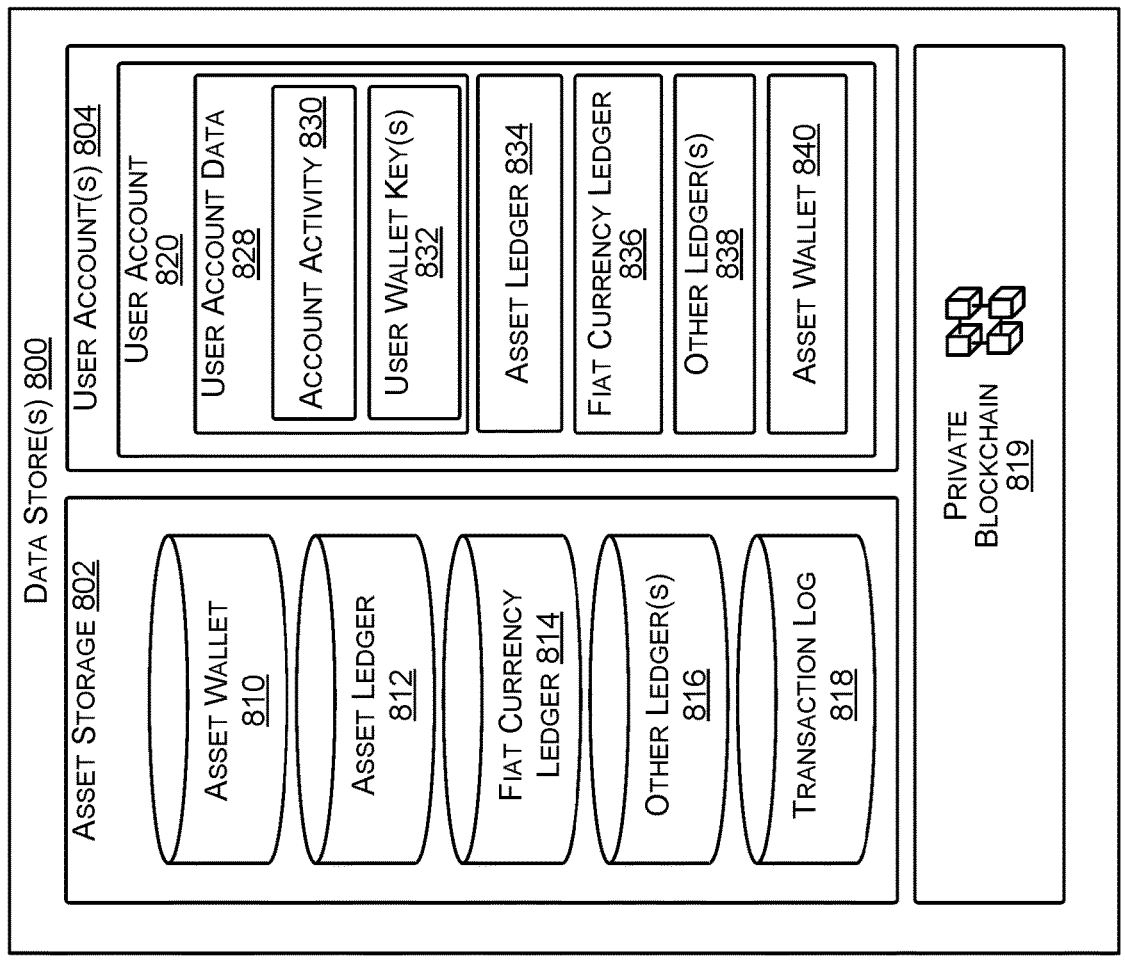
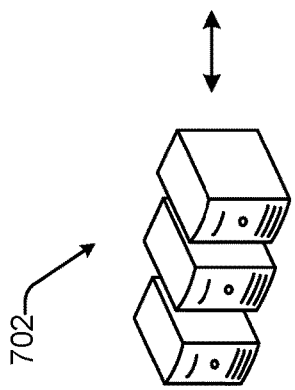
FIG. 8

USER INTERFACE FOR CONTEXTUAL VALIDATION OF RECOGNIZED TEXT

TECHNICAL FIELD

Applications, which are downloadable and executable on user devices, enable users to interact with other users. Such applications are provided by service providers and utilize one or more network connections to transmit data among and between user devices to facilitate such interactions. Many applications implement a data entry process that involves a user progressing through a series of user interfaces while manually entering text from a paper copy of a document via the application.

BRIEF DESCRIPTION OF THE DRAWINGS

Features of the present disclosure, its nature and various advantages, will be more apparent upon consideration of the following detailed description, taken in conjunction with the accompanying drawings.

FIG. 2A is an example user interface associated with an application-based tax interview process, the user interface presenting an interactive element to recognize a new tax form, according to an implementation of the present subject matter.

FIG. 2B is an example user interface associated with an application-based tax interview process, the user interface prompting a user to confirm a type of tax form that was recognized, according to an implementation of the present subject matter.

FIG. 2C is an example user interface associated with an application-based tax interview process, the user interface including media content relating to a type of tax form that was recognized, according to an implementation of the present subject matter.

FIG. 2D is an example user interface associated with an application-based tax interview process, the user interface presenting an image of a portion of a tax document adjacent to a field populated with a recognized text element for contextual validation of the recognized text element, according to an implementation of the present subject matter.

FIG. 2E is another example user interface associated with an application-based tax interview process, the user interface presenting an interactive element(s) in association with a field populated with a recognized text element for contextual validation of the recognized text element in the field, according to an implementation of the present subject matter.

FIG. 2F is an example user interface associated with an application-based tax interview process, the user interface prompting a user to submit another type(s) of tax document(s) associated with a group of users identified using a machine learning model(s), according to an implementation of the present subject matter.

FIG. 8 is an example data store used for performing techniques described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
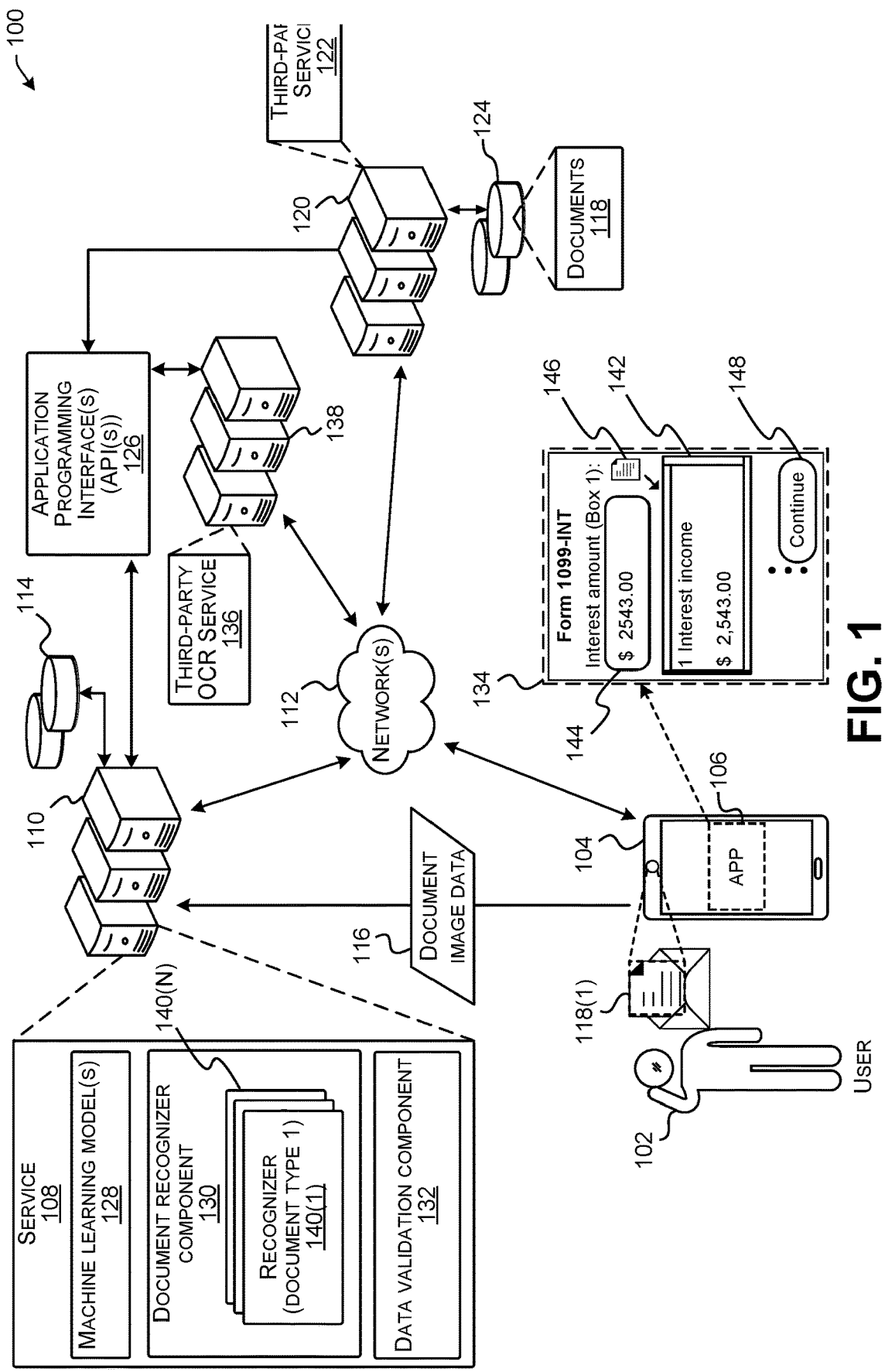
FIG. 1 is an example environment including a platform for contextual validation of recognized text, according to an implementation of the present subject matter.

Described herein are, among other things, techniques, devices, and systems for implementing a user interface for contextual validation of recognized text. In an example, a service computing platform may receive image data representing a document. This document may be associated with a user, and the document may include text that is to be validated and/or input in association with an application-based data input and/or validation process. Based at least in part on the image data, the service computing platform is configured to determine a type of the document (e.g., amongst multiple types of documents). The service computing platform is further configured to recognize one or more text elements included in one or more portions of the document, and determine a point (e.g., step, task, action, process, or the like) in the data input and/or validation process that is associated with the type of document and/or determine an electronic form that is associated with the type of document. The service computing platform is further configured to cause a user interface associated with the point and/or the electronic form to be displayed via an application executing on an electronic device of the user, the user interface presenting (i) an image(s) of the portion(s) (or snippets) of the document adjacent to a field(s) (e.g., a field(s) of the electronic form) populated with the text element(s), and (ii) at least one interactive element that, upon selection, indicates that the user validates the text element(s) within the field(s). This "side-by-side" data validation feature mitigates the so-called "tennis spectator problem" where a user is forced to avert their eyes from a computer screen in order to look at the text of a paper copy of a document, and subsequently redirect their eyes back to the computer screen in order to validate that the text of the paper copy of the document has been entered correctly into a field(s) (e.g., a field(s) of an electronic form) that is being displayed on the computer screen. In other words, by causing display of a user interface that presents a digital image of a relevant portion of a document adjacent to a corresponding field where text from that portion has been recognized and automatically populated into the corresponding field, a user is able to quickly and easily confirm that the text has been recognized and entered into the field correctly. It is to be appreciated that "side-by-side," in this context, does not limit the term "adjacent" used herein. A "side-by-side" arrangement is merely an example of presenting an image of a portion of the document adjacent to the field. As will be described in more detail below, the image can be presented adjacent to the field in other ways besides a "side-by-side" arrangement.

In an example, the application-based data input and/or validation process may be a tax interview process that involves a user progressing through a series of user interfaces of an application executing on an electronic device to file their taxes (e.g., with the Internal Revenue Service (IRS)). In this example, the user may have received a tax document in the mail (e.g., a paper copy of a 1099-INT form). The user, in this example, may capture an image of the tax document using a camera of the electronic device, and the corresponding image data may be received by a server computing device of the aforementioned service computing platform. The server computing device may process the image data to determine a type of the document. In this example, the server computing device determines that the document is a 1099-INT form based on the image data, and proceeds to recognize text elements included in the 1099-INT form. For example, the image data representing the tax document may be processed using a text recognition software program (e.g., an optical character recognition (OCR) program) to recognize the text elements. During this text recognition process, the server computing device may recognize a first text element (e.g., first dollar amount) included in a first portion of the 1099-INT form (e.g., Box 1—Interest amount), a second text element (e.g., a second dollar amount) included in a second portion of the 1099-INT form (e.g., Box 2—Withdrawal Penalty), and so on and so forth for any number of recognizable text elements in the tax document. The server computing device may further determine a point in the application-based tax interview process that is associated with the 1099-INT form. Additionally, or alternatively, the server computing device may determine an electronic form that is associated with the 1099-INT form. In this manner, the user can be "taken" directly to the relevant point in the tax interview process and/or directly to the relevant electronic form in order to validate the recognized text. For example, the application may display a user interface corresponding to the point in the tax interview process where the recognized text is auto-populated into the relevant fields of the electronic form, and images of the portions of the 1099-INT form where that text came from are displayed (or are displayable on-demand) adjacent to the auto-populated fields for quick and easy data validation. This provides benefits on any type of electronic device, especially those with small form factors (e.g., mobile phones).

The techniques, devices, and systems described herein result in an improved user interface for electronic devices. For example, conventional user interfaces require users to enter text manually into fields or present recognized text by itself, without any context as to where the recognized text came from (e.g., the source of the recognized text), which makes it difficult for a user to validate that the text has been recognized correctly. Moreover, manual data entry is error prone. The techniques, devices, and systems described herein cause a user interface to present contextually relevant information adjacent to text that has been recognized by a computer. For example, text may have been recognized from image data representing a document, and the user interface described herein may present, adjacent to a field that is populated with the recognized text, an image of a portion of the source document that includes the source text. In this manner, a user can validate the accuracy of the recognized text without looking away from the user interface. This results in an improved user interface that addresses problems with efficiency of using electronic devices, particularly those with small screens (e.g., mobile phones). By allowing a user's eyes to remain fixated on a display of an electronic device while comparing recognized text to corresponding source text, a user can more quickly validate the recognized text, thereby improving the speed of a user's navigation through various user interfaces of a data input and/or validation process.

The techniques, devices, and systems described herein allow one or more devices to conserve resources with respect to processing resources, memory resources, networking resources, power resources, etc., in the various ways described herein. For example, with the techniques described herein, a user does not have to waste time traversing through a linear data input and/or validation process (e.g., a tax interview process) where the user might click through a series of numerous user interfaces to complete the data input and/or validation process. Instead, the user can bypass one or more of these user interfaces by the techniques disclosed herein, such as by navigating the user directly to a point in the data input and/or validation process where text pertaining to a particular document is to be validated and/or input. Accordingly, the application does not have to display user interfaces that precede the relevant user interface where the text from the document is to be validated and/or input, which, in turn, conserves resources (e.g., resources of the electronic device of the user that are used to display those user interfaces, cloud resources that process database hits each time a new user interface is displayed on an electronic device, etc.). In the context of an application-based tax interview process, the average user completes their annual tax filing over the course of several (e.g., two to three) sessions of using the application. The techniques described herein increase the likelihood of a user completing a tax filing in a single session because of the user interface improvements mentioned above, which allow the user to quickly and easily validate text, thereby improving the speed of a user's navigation through various user interfaces of a tax interview process. In turn, cloud computing resources do not have to save the state of the user's partial progress through the tax interview process that is typically used for resuming the tax interview process in a subsequent session. Moreover, the need for credentials to log in to an account are reduced, if not eliminated, by allowing users to complete their tax filing in a single session, and instances of users having to start over from scratch are reduced as well. Moreover, with the techniques described herein, a user does not have to scour through user interfaces of an application or the Web looking for help articles, thereby reducing computing resource consumption associated with such scouring activity.

In general, the techniques, devices, and systems described herein automate a traditionally manual data entry process by reducing, if not eliminating, the need for a user to enter data (e.g., text) into an electronic form. In the context of an application-based tax interview process, the techniques described herein automate taxes so that the user does not have to be a tax professional; the computer becomes the tax professional, and the user is merely a tax validator who confirms that the computer recognized text from a tax document correctly. In a fully automated case, users do not have to enter data manually whatsoever. For instance, a user may take a picture of a document and select an interactive element(s) of an application executing on an electronic device to validate the computer-recognized text. Automation of a traditionally manual data entry process also reduces the error rate of entering data because machines are, on average, better than humans at entering data correctly. In the context of an application-based tax interview process, this can translate into a higher success rate of a government entity (e.g., the IRS) accepting a user's tax filing. Less instances of such a government entity rejecting tax filings means that fewer users have to refile their taxes, which conserves computing resources that would otherwise be used to convert tax data into a correct format (e.g., extensible markup language (XML) format) and to transmit the formatted data to a computing system of the government entity over a network each time a user refiles their taxes electronically.

The techniques, devices, and systems described herein provide an improved user experience. Conventional data entry processes involve a user progressing through numerous sequential data entry steps in a linear fashion, which can be tedious and, in many cases, requires the user to save their progress and finish a remainder of the data entry process after taking a break. As mentioned above, the techniques described herein allow a user to bypass one or more user interfaces and proceed directly to a user interface where text pertaining to a particular document is to be validated and/or input. By navigating the user directly to a point in a data input and/or validation process where text is to be validated and/or input, the user does not need to click through needless user interfaces that precede the user interface where text from a document is to be validated and/or input. Consider an example where the user has progressed partway through an application-based tax interview process, and the user receives a tax document in the mail that is relevant to the tax interview process. Instead of going back to the beginning to start over with the entire tax interview process, the user can capture an image of the tax document, and, upon recognizing the type of document, the disclosed techniques can be implemented to present, to the user, a user interface that corresponds to the relevant point in the tax interview process where text from the tax document is to be input and/or validated. In another example, a user may not have started an application-based tax interview process, and the user can capture an image of a tax document, whereafter the user is taken directly to the point in the tax interview process that is relevant to that tax document (e.g., without having to traverse through numerous preceding user interfaces in order to get to the same point), saving the user time and energy for an improved user experience, as compared to conventional application-based data entry processes.

As mentioned above, the techniques, devices, and systems described herein solve the so-called "tennis spectator" problem where a user is forced to avert their gaze from a computer screen to compare text on a paper copy of a document to text on the computer screen. Techniques described herein cause a user interface to present contextually relevant information adjacent to text that has been recognized by a computer so that the recognized text can be conveniently validated by a user without averting their gaze from the computer screen. In other words, this "side-by-side" data validation feature makes it easy for the user to compare two values (one from the image of a source document and one that was recognized by a computer and input automatically into an electronic form) to determine if the computer system misrecognized the source text. This eliminates the need for the user to look back-and-forth between a screen and a paper copy of a document (much like a tennis spectator at a tennis match).

The techniques, devices, and systems described herein provide visibility into the provenance of recognized text. Conventional user interfaces present recognized text by itself, without any visibility into the provenance of the recognized text. Accordingly, users have to take extra steps to find out where the recognized text came from. By presenting images of source text next to fields of an electronic form that are populated with the corresponding recognized text, as described herein, a user can better understand the provenance of the recognized text (e.g., by understanding where the text came from, such as the source of the text). This, in turn, garners trust amongst users of the platform.

The techniques, devices, and systems described herein help ensure that a user's tax filing is thorough and complete. For example, techniques described herein use machine learning to identify cohorts of users that have provided particular types of tax documents during an application-based tax interview process, and a user can be prompted for other tax documents that the machine learning model predicts the user might need to submit for filing their taxes in a thorough and complete manner. In other examples, machine learning can be used to improve text recognition accuracy (e.g., by improving image quality and/or predicting the correct type of document from document image data).

While several examples presented herein are directed to implementing a user interface for contextual validation of recognized text in the context of an application-based tax interview process, the techniques described herein are also applicable to other types of data input and/or validation processes involving the validation of data included in documents, including non-tax documents. Examples of other types of data input and/or validation processes besides a tax interview process include loan application processes (e.g., capital loan, buy now pay later loan, home loan, etc.), medical data validation (e.g., recognizing text in medical forms), digitizing paper records (e.g., converting paper books to digital form), identity verification (e.g., recognizing text or images in identification documents, such as driver's licenses or passports), or the like. Furthermore, although text is described herein as the data that is to be validated and/or input, it is to be appreciated that the techniques and systems described herein are applicable to recognition and validation of other types of data, such as audio data, video data, image data, or the like. Furthermore, while reference is made to an application-based tax interview process, techniques described herein can be similarly applicable to a web-based tax interview process, wherein methods and/or user interfaces described herein are implemented, at least partially, via a web browser on a user device.

The preceding summary is provided for the purposes of summarizing some example embodiments to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 is an example environment 100 including a platform for contextual validation of recognized text, according to an implementation of the present subject matter. As depicted, the example environment 100 may include users, such as the user 102. Users may be associated with respective electronic devices, such as the electronic device 104 associated with the user 102 in FIG. 1. The electronic device 104 is configured to execute an application 106 (interchangeably referred to as "app" 106), e.g., a tax application, a payment application, or the like. The application 106, when executing on the electronic device 104, may allow the user 102 to navigate to the various user interfaces described herein, and to interact with or access services, such as the service 108. In some examples, users, such as the user 102, can interact with the user interfaces, for example, to engage in an application-based data input and/or validation process, such as a tax interview process. In these examples, the service 108 may represent or otherwise include a tax service to assist users with electronically filing their taxes (e.g., federal income tax, state income tax, etc.). It is to be appreciated, however, that the service 108 may represent or otherwise include other types of services, such as a payment service that facilitates transactions (e.g., electronic payments) with other users, and/or with merchants, among other things. For example, the application 106 may allow two users who are "peers" to transfer funds in a "peer-to-peer (P2P)" transaction. In some examples, the application 106 allows a merchant and a customer of the merchant to transfer funds between each other, such as when the customer is purchasing an item(s) from the merchant.

In some examples, the application 106 can be provided by a service computing platform 110. For example, the user 102 may download and install a particular version of the application 106 on their electronic device 104, either via a first time installation, a software update, or the like. As depicted by FIG. 1, the electronic device 104 may be coupled to the service computing platform 110 via one or more network(s) 112, such as a wide area network (WAN) (e.g., the Internet, a cellular network, etc.). In some examples, the service computing platform 110 may include a cloud-based computing architecture suitable for hosting and servicing instances of the application 106 executing on electronic devices, such as the electronic device 104. In particular examples, the service computing platform 110 may include a Platform as a Service (PaaS) architecture, a Software as a Service (SaaS) architecture, an Infrastructure as a Service (IaaS), a Data as a Service (DaaS), a Compute as a Service (CaaS), or other similar cloud-based computing architecture (e.g., "X" as a Service (XaaS)). The service computing platform 110 may be used to implement the aforementioned service 108, as described herein.

A service provider may operate the service computing platform 110, which may include one or more processing devices, such as one or more servers (or server computing devices), and one or more data stores 114. The one or more processing devices (e.g., servers) may be configured to provide processing or computing support for instances of the application 106 executing on electronic devices, such as the electronic device 104. The data stores 114 may include, for example, one or more internal data stores that may be utilized to store data (e.g., document image data, user profile data, user transaction history data, user purchase history data, user attribute data, user credit history data, user asset profile data, user contextual data, user interaction data, user preference data, and so forth) associated with users, such as the user 102.

In particular examples, the one or more data stores 114 may be configured to store one or more data structures designed for recording asset ownership for various users, such as the user 102. As an example and not by way of limitation, the data store(s) 114 may be configured to store one or more ledgers (e.g., internal ledgers, distributed ledgers, etc.) for tracking assets held by the service computing platform 110—each such asset being held by the service computing platform 110 may be owned in whole or in part by the service computing platform 110 itself or in whole or in part by one or more users of the service computing platform 110. The ledger(s) may store service balances associated with the service computing platform 110 representing quantities of assets held by the service computing platform 110. The service balances may include, for example, a fiat currency balance for each of one or more fiat currencies, a securities balance for each of one or more security assets, a cryptocurrency balance for each of one or more cryptocurrencies, other suitable data records, or any combination thereof. The data store(s) 114 may also be configured to store additional ledgers for individual users, such as the user 102. The ledger(s) may be stored as part of a user profile or asset profile for individual users, such as the user 102.

In the example of FIG. 1, the service computing platform 110 may receive image data 116 representing a document 118(1) (or "document image data 116"). This document 118(1) may be associated with the user 102, and the document 118(1) may include text that is to be input and/or validated during an application-based data input and/or validation process. FIG. 1 shows an example where the document image data 116 is received over the network(s) 112 from the electronic device 104 of the user 102. Additionally, or alternatively, the service computing platform 110 may receive document image data 116 over the network(s) 112 from other sources, such as from a third-party computing platform 120. For example, the third-party computing platform 120 depicted in FIG. 1 may implement a third-party service 122, such as a payroll service, a human resources (HR) service, and/or a tax service, where, as part of the service 122, users (e.g., the user 102) are provided with access to documents 118, such as tax documents. FIG. 1 shows the documents 118 as being maintained in a third-party data store(s) 124. In some examples, the service computing platform 110 may receive document image data 116 via an application programming interface(s) (API(s)) 126. For example, the third-party service 122 may utilize the API(s) 126 to provide document image data 116 to the service computing platform 110, and/or the service computing platform 110 may utilize the API(s) 126 to request document image data 116 from the third-party service 122.

Using the example of FIG. 1 for illustration, the user 102 might have received an envelope in the mail (e.g., the envelope may have been received in a physical mailbox), and the envelope may contain a paper copy of the document 118(1). In a tax example, the envelope may have written thereon a message reading "Important Tax Documents Enclosed." The user 102 may open the envelope to read the document 118(1), and, at some point, the user 102 may utilize the application 106 to recognize the document 118(1). In an example where the document 118(1) is a tax document, the application 106 may recognize the document 118(1) for purposes of assisting the user 102 with filing their taxes electronically via an application-based tax interview process.

In some examples, the user 102 may open the application 106 (e.g., by selecting an icon representing the application 106 on a home screen, from an application menu, etc.), and the user 102 may select an interactive element of the application 106 to add a new form, or to otherwise have the service computing platform 110 recognize the document 118(1). In this example, the application 106 may prompt the user 102 to capture an image(s), video(s), or other content representative of the document 118(1) (e.g., using a camera(s) of the electronic device 104, a document scanner, etc.). Once the user 102 has captured an image(s), video(s), or other content representative of the document 118(1) (e.g., using a camera(s) of the electronic device 104, a document scanner, etc.), the user 102 may submit the image(s) of the document 118(1) (or video(s), or other content representative of the document 118(1)) as part of a request to recognize the document 118(1) and/or the request may be sent automatically, without user intervention, upon capturing the image(s), video(s), or other content representative of the document 118(1), causing the electronic device 104 and/or the application 106 to transmit the document image data 116 to the service computing platform 110 over the network(s) 112. It is to be appreciated that the document image data 116 may be received via the application 106 or any other suitable software executing on the electronic device 104, such as via a webpage, via an instant app (e.g., a portion of an application), or the like. In some examples, the user 102 submitting an image(s) of the document 118(1) (or video(s), or other content representative of the document 118(1)) may cause the application 106 to transition to the foreground (from the background). In some examples, the user 102 submitting an image(s) of the document 118(1) (or video(s), or other content representative of the document 118(1)) may prompt a download of a full version of the application 106. Accordingly, a user's electronic device 104, in some examples, may not have the application 106 installed thereon at a time that the document image data 116 is received by the service computing platform 110, and the application 106 may be installed on the electronic device 104 at a later time (e.g., after the document image data 116 is received by the service computing platform 110). In other examples, a full version of the application 106 is installed on the electronic device 104 prior to the service computing platform 110 receiving the document image data 116.

In some examples, the service 108 is configured to estimate or predict the user's tax refund based on user data available in the data store 114 (e.g., data relating to a tax filing(s) from a previous year(s), transaction data (e.g., sales tax paid, securities bought or sold, cryptocurrency bought or sold, etc.), paycheck data relating to paychecks deposited to an account associated with the application 106 and maintained in the data store 114, etc.), and the service 108 may send the user 102 an electronic mail (email) that provides information pertaining to the estimated or predicted tax refund along with an interactive element that, upon selection, causes the application 106 to open (and/or causes the application 106, or an instant application associated therewith, to be downloaded) on the electronic device 104. In this example, the user 102 may subsequently capture an image(s), video(s), or other content representative of the document 118(1), as described above, causing the document image data 116 to be transmitted to the service computing platform 110. In another example, the user 102 may be accessing a webpage that allows the user 102 to upload an image of the document 118(1), causing the document image data 116 to be transmitted to the service computing platform 110, and possibly deep-linking to the application 106 (and/or causing the application 106, or an instance application associated therewith, to be downloaded) on the electronic device 104.

In some examples, the user 102 can interact with multiple electronic devices, such as a mobile phone and a desktop computer. In some examples, the mobile phone can act as an extension of the desktop computer such that when a document is requested for upload or is otherwise to be uploaded, the user can capture an image of the document using their mobile device and the application 106 cause the document image data to be provided to the desktop computer. In some examples, the document image data can be transmitted via a long-range wireless network and via the service computing platform 110. In some examples, the document image data can be transmitted via a short-range wireless network and directly to the desktop computer (without being transmitted via the service computing platform 110 first), for example when the electronic devices are within a threshold distance of one another.

In some examples, in addition, or as an alternative, to receiving a paper copy of the document 118(1) in the mail, the user 102 may receive the document 118(1) electronically (e.g., via email, such as by receiving an email with the document 118(1) attached to the email). In this example, the user 102 may send the electronic version of the document 118(1) to the service computing platform 110 without having to digitize a paper copy of the document 118(1) using a camera, a document scanner, or the like. In some examples, and as mentioned above, the user 102 may not be involved in providing the document image data 116 to the service computing platform 110 whatsoever. For example, the service computing platform 110 may be configured to receive document image data 116 from the third-party computing platform 120 (e.g., via the API(s) 126) without action from the user 102, such as when the documents 118 are generated, periodically, etc.

The document image data 116 may represent any suitable file format including, but not limited to, Joint Photographic Experts Group (JPEG) format, Graphics Interchange Format (GIF), Portable Network Graphics (PNG) format, Tagged Image File Format (TIFF), Portable Document Format (PDF), or any other suitable format. Accordingly, the document image data 116 may represent a file corresponding to the document 118(1), which can be sent in one or more packets over the network(s) 112. Upon receiving the document image data 116, the service computing platform 110 may process (e.g., analyze) and/or store the document image data 116 in the data store(s) 114. As shown in FIG. 1, the service 108 may include one or more machine learning models 128, a document recognizer component 130, and a data validation component 132. The document recognizer component 130, the data validation component 132, and the service 108 itself, may represent computer-executable instructions that, when executed by a processor(s), cause performance of one or more operations described herein. The document recognizer component 130 may be configured to recognize text, images, and the like included in the documents 118, and the data validation component 132 may be configured to guide users, such as the user 102, through an application-based data input and/or validation process (e.g., a tax interview process) via a series of user interfaces of the application 106. FIG. 1 shows one example user interface 134 that may be displayed on the electronic device 104 as part of the application-based data input and/or validation process. In some examples, one or more of the components 130, 132 may utilize the trained machine learning model(s) 128 to perform these and/or other tasks. For example, the document recognizer component 130 may use the trained machine learning model(s) 128 to determine a type of the document 118(1).

Machine learning generally involves processing a set of examples (called "training data" or a "training dataset") in order to train a machine learning model(s). A machine learning model(s) 128, once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). In the context of the present disclosure, the unknown input may be the document image data 116 representing the document 118(1), and/or a signal(s) that is/are generated based on the document image data 116, and the trained machine learning model(s) 128 may be tasked with outputting a classification of the document 118(1) as one of multiple class labels. In a tax example, the multi-label classification task may be to classify the type of the document 118(1) as one of a W2, a 1099-INT, a 1099-DIV, a 1099-B, a 1099-G, and so on. In some examples, the trained machine learning model(s) 128 may be trained to determine different types of statements and/or to determine tax documents (e.g., W2, 1099-INT, etc.) associated with such statements. For example, the document 118(1) represented by the document image data 116 may be a statement associated with the user 102, the statement including transaction data (e.g., purchases and/or sales) relating to an asset(s) (e.g., cryptocurrencies, securities, stocks, bonds, etc.). Accordingly, the unknown input may be document image data 116 representing a statement associated with the user 102, and the trained machine learning model(s) 128 may classify the type of the document 118(1) as one of multiple types of statements and/or tax documents corresponding to the type of statement. Benefits to using a trained machine learning model(s) 128 to determine the type of the document 118(1) include providing more flexibility for different use cases and adapting faster to novel types of documents. Moreover, using machine learning to determine the type of the document 118(1) may be advantageous in instances where the document 118(1) is damaged (e.g., if the user's dog ate the corner off of a paper copy of the document 118(1), if water was spilled on a portion of the document 118(1), etc.).

In some examples, the document recognizer component 130 may use a text recognition software program (e.g., an OCR program) to determine a type of the document 118(1) based on the document image data 116. In some examples, as depicted in FIG. 1, text recognition may be outsourced to a third-party OCR service 136. In this example, the service computing platform 110 may send the document image data 116 to a third-party computing platform 138 that implements the third-party OCR service 136, such as via the API(s) 126, and the third-party computing platform 138 is configured to return a text recognition result(s) to the service computing platform 110. Regardless of where the text recognition is performed in the environment 100, a text recognition software program may process the document image data 116 to obtain text of the document 118(1), and the text may be analyzed to identify predefined strings for determining the type of the document 118(1). In a tax example, the predefined strings may include, but are not limited to, "W2," "1099-INT," "1099-DIV," "1099-B," "1099-G," or the like. Accordingly, the document recognizer component 130 may be configured to search the text of the document 118(1), and if a predefined string (e.g., the string "1099-INT") is identified in the text, the document 118(1) is classified in accordance with the identified string (e.g., the document 118(1) may be classified as a 1099-INT form). In some examples, the document recognizer component 130 may be configured to perform a location-based search of the text of the document 118(1) to determine the type of the document 118(1). In the running example of a 1099-INT form, the document recognizer component 130 may locate the top-right box and/or a box within predefined coordinates of the image of the document 118(1), and if a predefined string (e.g., the string "1099-INT") is included in the located box, the document 118(1) is classified in accordance with the string.

In some examples, a trained machine learning model(s) 128 is used to improve the quality of the document image data 116 prior to using a text recognition software program (e.g., an OCR program) to determine a type of the document 118(1). For example, the document image data 116 may be provided as input to the trained machine learning model(s) 128, and the trained machine learning model(s) 128 may generate, as output, image data that is of higher quality (e.g., higher resolution) than the input document image data 116. The document recognizer component 130 may then use a text recognition software program (e.g., an OCR program) to determine a type of the document 118(1) based on higher-quality image data generated by the machine learning model(s) 128. This may improve the accuracy of text recognition and/or the determination of the type of the document 118(1).

The document recognizer component 130 may be further configured to recognize one or more text elements included in one or more portions of the document 118(1). The text element(s) may be recognized after the type of document 118(1) is determined, and, in some examples, a document type-specific recognizer 140 is used to recognize the text element(s) included in the document 118(1). That is, the document recognizer component 130 may be configured to utilize one of a plurality of different text recognition software programs 140(1)-140(N) (where N is any suitable integer greater than one), each text recognition software program 140 being associated with a particular type of document. For example, if the document recognizer component 130 is configured to recognize text elements included in document types 1-N, the text recognition software programs 140(1)-(N) may include a first text recognition software program 140(1) associated with document Type 1, a second text recognition software program 140(2) associated with document Type 2, . . . , and an Nth text recognition software program 140(N) associated with document Type N. In a tax example, the first text recognition software program 140(1) may be associated with a W2 form, the second text recognition software program 140(2) may be associated with a 1099-INT form, and so on and so forth. The document type-specific recognizers (collectively 140) may each utilize a specific template that corresponds to a particular type of document to perform text recognition for recognizing text elements of interest. In some examples, text elements of interest are recognized from the text of the document 118(1) while other text (text that is not of interest) is ignored. For example, a text recognition software program 140(1) may be configured to recognize a subset of text elements included in the document 118(1) that are to be validated and/or input in a data input and/or validation process, in which case a remainder of the text elements may not be recognized for use in the data input and/or validation process. Said another way, the text recognition software program 140(1) associated with a particular type of document 118(1) may be tailored to recognize text elements that are to be populated into fields of an electronic form, while other text elements may be ignored.

While reference is made above to recognizing text elements, in additional or alternative examples, the same or similar techniques can be used to recognize other patterns, such as images or the like. In other words, any suitable pattern recognition model can be used to implement the techniques described herein to recognize any suitable patterns including, without limitation, graphics, colors, textures, text, or other indicia. "Pattern recognition model," as used herein, can be a text recognition model, such as a text recognition software program.

In some examples, the document recognizer component 130 and/or a particular document type-specific recognizer 140 may be configured to determine coordinates of a bounding box(es) around the recognized text element(s) in the document 118(1). In some examples, such bounding box coordinates may be returned in metadata with the recognized text element. In some examples, the bounding box coordinates are pixel coordinates that define a location and a size of the bounding box, such as by defining a top-left corner of the bounding box as (X1, Y1) and a bottom-right corner of the bounding box as (X2, Y2), where X1, X2, Y1, and Y2 represent a number of pixels from an origin location in the image of the document 118(1) in X and Y directions, respectively. In other words, coordinates for an individual bounding box may include multiple sets of X, Y coordinates. The bounding box coordinates may be utilized to generate images of portions of the document 118(1) that include the recognized text elements. Such images may be stored in the data store 114, in some examples.

As mentioned above, the data validation component 132 may be configured to guide users, such as the user 102, through an application-based data input and/or validation process (e.g., a tax interview process) via a series of user interfaces of the application 106. In some examples, prior to the user 102 initiating the application-based data input and/or validation process, the data validation component 132 can request the user 102 to authenticate. In some examples, when the user 102 is using the application 106, the user 102 can authenticate by providing a password, pin, biometric identifier, or the like to enable the service 108 to authenticate the user 102 (e.g., based on the provided password, pin, biometric identifier, or the like being mapped to a user profile of the user 102). In some examples, when the user 102 is accessing the data input and/or validation process through a web browser, the user 102 can interact with a quick response (QR) code (e.g., scan the QR code using the electronic device 104, which can utilize device information, application information, or the like) to authenticate the user 102. In some examples, when the user 102 is accessing the data input and/or validation process through a web browser, the service 108 can utilize location data, sound data, or the like to determine a proximity between the electronic device 104 and the user device displaying the web browser. Using location data, sound data, or the like, the service 108 can determine that the electronic device 104 and/or application 106 are within a threshold distance of the user device displaying the web browser and can therefore can authenticate the user 102.

In a tax example, the data input and/or validation process may involve the user 102 progressing through the series of user interfaces, at least some of which are presented to allow the user 102 to enter or input text and/or validate text elements that have been recognized by the document recognizer component 130 and/or a particular document type-specific recognizer 140. Accordingly, once the type of the document 118(1) has been determined, as described above, the data validation component 132 may be configured to determine a point in the data input and/or validation process (e.g., the tax interview process) that is associated with the type of document 118(1). Additionally, or alternatively, the data validation component 132 may be configured to determine an electronic form that is associated with the type of document 118(1). In this way, instead of having the user 102 progress through a series of user interfaces that lead up to the relevant user interface 134 where recognized text elements are to be validated and/or input, the application 106 can navigate directly to the user interface 134 that is associated with the point in the data input and/or validation process and/or the electronic form so that the user 102 can skip over a preceding portion of the data input and/or validation process (e.g., if that portion of the data input and/or validation process is irrelevant to the user 102, or the user 102 has already completed that portion of the data input and/or validation process, or if that portion of the data input and/or validation process will be completed at a later time). From the user's perspective, upon capturing an image of the document 118(1), the application 106 may "land" the user 102 at the point (e.g., the user interface 134) in data input and/or validation process (e.g., the tax interview process) associated with the type of document determined by the service 108. In the example of FIG. 1, the user 102 is landed on a screen where the recognized text elements from a 1099-INT document 118(1) have been populated into fields of a corresponding electronic form.

In some examples, types of documents can be mapped to or otherwise associated with particular electronic forms or user interfaces that are configured to receive inputs associated with data to be input into the electronic forms. In some examples, individual user interfaces can be associated with identifiers, such as uniform resource locators (e.g., URLs). These mappings and/or associations can be stored in the data store 114. As such, once the type of document has been determined for a document, the data validation component 132 can perform a lookup to determine which electronic form, user interface, and/or identifier corresponds to the type of document and can cause the electric form and/or user interface to be displayed. In this way, the user 102 can "land" on the appropriate user interface without having to navigate through other user interface(s) that may not be relevant to the document 118.

The example user interface 134 in FIG. 1 may be displayed on the electronic device 104 via the application 106 and may present an image 142 of a portion of the document 118(1) adjacent to a field 144, which may be a field of an electronic form associated with the type of the document 118(1) (e.g., a 1099-INT electronic form). "Adjacent," in this context, can mean that the image 142 is presented next to the field 144, such as below the field 144, above the field 144, to the left of the field 144, to the right of the field 144, or any combination thereof (e.g., along a diagonal). "Adjacent," in this context, can also mean within a threshold distance of the field 144, such as within an inch of the field 144, within two inches of the field 144, within 3 inches of the field 144, or the like. In some examples, the image 142 can be presented "directly adjacent" to the field 144 such that no user interface elements are presented between the image 142 and the field 144. In some examples, the image 142 may be presented in the user interface 134 persistently and without user action. In some examples, the user 102 may provide user input via the user interface 134 to cause the image 142 to be presented. For example, the user interface 134 may present an interactive element 146 adjacent to the field 144, the interactive element 146, upon selection, causing the image 142 to be presented adjacent to the field 144. In some examples, the user 102 may be able to toggle the image 142 between being presented and being hidden. In some examples, additional fields around (e.g., below) the field 144 may move dynamically (e.g., shift downwards) in response to the user 102 interacting with the interactive element 146, which causes the user interface 134 to present the image 142 adjacent to the field 144. In other words, the user interface 134 may be modified dynamically by shifting user interface elements (e.g., fields, buttons, etc.) to make room for the image 142 when the user 102 requests display of the image 142. As indicated by the ellipsis in the user interface 134, the user interface 134 may include additional fields similar to the field 144, as well as additional images similar to the image 142 and/or additional interactive elements similar to the interactive element 146 for causing the images to be presented adjacent corresponding fields.

FIG. 1 also shows that the field 144 is auto-populated (or auto-filled) with a recognized text element. In the example of FIG. 1, a recognizer 140 associated with the 1099-INT document 118(1) has recognized a text element of "$2543.00" in a portion of the 1099-INT document 118(1), and the data validation component 132 has populated the field 144 of the 1099-INT electronic form with the recognized text element of "$2543.00." Additional fields in the user interface 144 may be populated with recognized text elements in a similar manner, as indicated by the ellipsis in the user interface 134. Accordingly, the user 102 is able to quickly scan the user interface 134 without averting their gaze from the user interface 134 to validate that the text from the document 118(1) has been recognized and entered into the fields (e.g., the field 144) correctly.

As shown in FIG. 1, the user interface 134 may further present at least one interactive element 148 (e.g., a "continue" button) that, upon selection, indicates that the user 102 validates the text element(s) within the field(s) (e.g., the field 144). That is, if the user 102 confirms that the text element populated in the field 144 matches the corresponding source text in the image 142, the user 102 may validate the text element populated in the field 144 by selecting the interactive element 148 in the example of FIG. 1. Moreover, as mentioned above, the user 102 does not have to avert their gaze from the user interface 134 to validate the text element within the field 144 because the image 142 of the source text is presented adjacent the field 144, thereby allowing the user 102 to validate the text without having to avert their gaze to look at the paper copy of the document 118(1).

In some examples, the user interface 134 can additionally or alternatively include information about the document 118(1) to provide the user 102 with additional context and/or information.

FIG. 2A is an example user interface 200A associated with an application-based tax interview process, according to an implementation of the present subject matter. The user interface 200A may be displayed via the application 106 executing on the electronic device 104 of the user 102 at any suitable time. For example, the user interface 200A may be displayed in response to the user 102 opening the application 106 and/or selecting an interactive element to begin or resume the tax interview process. In the example of FIG. 2A, the user 102 may have already completed part of the tax interview process, such as by answering one or more questions about the user's basic information, such as the user's name, address, and the like. In some examples, the user 102 may have answered questions about how many dependents (e.g., children) they have, their filing status (e.g., single, married filing jointly, married filing separately, etc.), and the like. The example user interface 200A is also shown as presenting an interactive element 202 (e.g., an "add new form" button) to recognize a new tax form. Upon interacting with (e.g., selecting) the interactive element 202, a camera(s) of the electronic device 104 may be used to capture an image(s), a video(s), or other content representative of a paper copy of a document 118, such as a tax document. In some examples, upon interacting with the interactive element 202, the application 106 may present different options for adding a new tax form, such as by taking a picture with the camera of the electronic device 104, scanning the document 118 in a document scanner (e.g., a flatbed scanner), accessing a file corresponding to the document 118 that is stored on the electronic device 104 or in a remote storage location accessible to the electronic device 104 and uploading the file.

After adding a new form, document image data 116 is received by the service computing platform 110, as described above. The machine learning model(s) 128 and/or the document recognizer component 130 may determine a type of the document 118 based on the document image data 116. In some examples, the application 106 may prompt the user 102 to confirm that the correct type of document 118 was determined. FIG. 2B is an example user interface 200B that may prompt the user 102 to confirm a type of document 118 (e.g., tax form) that was recognized, according to an implementation of the present subject matter. The example user interface 200B presents information indicating that a particular type of document 118 has been recognized. In the example of FIG. 2B, the presented information indicates that a 1099-INT document 118 has been recognized. The example user interface 200B further presents an interactive element 204 (e.g., a "Yes" button) for the user 102 to confirm that the correct type of document 118 was determined, and an interactive element 206 (e.g., a "No" button) for the user 102 to indicate that the type of document 118 has been incorrectly recognized. In the example of FIG. 2B, the user 102 confirms that the correct type of document 118 was recognized.

FIG. 2C is an example user interface 200C that includes media content 208 relating to a type of document 118 (e.g., tax form) that was recognized, according to an implementation of the present subject matter. The user interface 200C may be displayed at any suitable time, such as in response to the user 102 adding a new form by interacting with (e.g., selecting) the interactive element 202 of FIG. 2A, and/or in response to the machine learning model(s) 128 and/or the document recognizer component 130 determining a type of the document 118 based on the document image data 116, and/or in response to the user 102 confirming that the correct type of document 118 was recognized by interacting with (e.g., selecting) the interactive element 204 of FIG. 2B. In other words, if the service 108 determines that the document 118 is a 1099-INT form, and possibly after the user 102 confirms that this is the correct type of document 118, the media content 208 relating to the 1099-INT form may be presented via the user interface 200C. In some examples, the media content 208 represents video content that is played back for the user 102 to watch, but any suitable type of media content 208 can be presented, such as text content, image content, audio content, or the like. The media content 208 may provide the user 102 with more information associated with the recognized document 118. In some examples, the media content 208 is an introduction to the document 118 that was recognized, which may be useful for users who are unfamiliar with the type of document 118. In some examples, the media content 208 is a video infomercial about the recognized type of document 118 (e.g., an infomercial about the 1099-INT form). In some examples, the media content 208 provides an explanation to the user 102 about what the document 118 means for the user 102, what to expect in the coming screens (e.g., the next steps of the tax interview process), and the like. In some examples, the user interface 200C provides the user 102 with the option to skip over the media content 208, such as by presenting an interactive element 210 (e.g., a "skip" button). That is, upon interacting with (e.g., selecting) the interactive element 210, the user interface 200C may cease presenting the media content 208 and may proceed to the user interface 200D shown in FIG. 2D. This may be useful for users who are already familiar with the type of document 118 that the media content 208 relates to.

FIG. 2D is an example user interface 200D presenting an image 142(1) of a portion of a document 118 (e.g., a tax document) adjacent to a field 144(1) populated with a recognized text element for contextual validation of the recognized text element, according to an implementation of the present subject matter. The example user interface 200D may be similar to the user interface 134 of FIG. 1. The user interface 200D may be displayed at any suitable time. In some examples, the user interface 200D is displayed in response to determining a point in a data input and/or validation process (e.g., a tax interview process) that is associated with a type of the document 118 in question. For example, the service computing platform 110 may receive document image data 116 representing a document 118, and may determine (e.g., using the trained machine learning model(s) 128 and/or the document recognizer component 130) a type of the document 118, as described herein. In the running example, the type of the document 118 is a 1099-INT form. Accordingly, the data validation component 132 may determine a point in a data input and/or validation process (e.g., a tax interview process) associated with the type of the document 118, and the service computing platform 110 may cause the user interface 200D associated with that point to be displayed via the application 106 executing on the electronic device 104. In some examples, the user 102 is navigated directly to the point in the data input and/or validation process (e.g., the tax interview process) that is relevant to the recognized type of document 118 without causing one or more user interfaces that precede the user interface 200D to be displayed via the application 106 prior to the user interface 200D being displayed. In other words, the data input and/or validation process (e.g., the tax interview process) may involve the user 102 progressing through a series of user interfaces leading up to the user interface 200D, and upon the service computing platform 110 receiving document image data 116 representing the document 118, the user interface 200D can be displayed without displaying the user interface(s) that precede the user interface 200D in the series of user interfaces prior to the user interface 200D being displayed. In some examples, the points in the data input and/or validation process (e.g., the tax interview process) are marked with respective identifiers of different type of documents 118, and the data validation component 132 is configured to look up the identifier corresponding to the type of document 118 in question and navigate directly to the point in the data input and/or validation process with that "document type" identifier. That is, user interface 200D can be a user interface in a series of user interfaces (e.g., user interface 200A, 200B, 200C, 200D, etc.) and, in examples where the service computing platform 110 causes the user interface 200D to be presented in response to the determination of the document type, the application 116 can instantly and automatically display the user interface 200D without having first displayed user interfaces 200A, 200B, or 200C (e.g., user interfaces that precede the user interface 200D in the series of user interfaces). In some examples, the application 116 may not be running in the foreground when the document image data is captured and, upon identification of the type of document 118, the application 116 can transition to the foreground displaying the user interface 200D.

In FIG. 2D, the user interface 200D presents an electronic form 212 having multiple fields 144. Fields 144(1), 144(2), and 144(3) are shown in FIG. 2D, but it is to be appreciated that the electronic form 212 may include addition fields 144 (e.g., if the user 102 scrolls down on the display of the electronic device 104. Accordingly, in some examples, the user interface 200D is displayed in response to determining an electronic form 212 that is associated with the type of the document 118 in question. In some examples, this electronic form 212 may be associated with a particular point in the data input and/or validation process (e.g., the tax interview process). Accordingly, in some examples, the data validation component 132 is configured to look up an identifier of the electronic form 212 corresponding to the type of document 118 in question and navigate directly to the point in the data input and/or validation process with that "electronic form" identifier. In the example of FIG. 2D, the electronic form 212 is a 1099-INT electronic form). The fields 144 of the electronic form 212 can be arranged in any suitable arrangement, such as vertically. For example, the electronic form 212 may include a list of vertical fields. In some examples, a text description is presented in association with each field 144, such as "Interest amount (Box 1)" presented in association with the first field 144(1), "Withdrawal penalty (Box 2)" presented in association with the second field 144(2), "Interest on US savings bonds (Box 3) presented in association with the third field 144(3), and so on and so forth.

In some examples, the fields 144 are auto-populated (or auto-filled) with respective recognized text elements from the document 118. For example, and as described above, a recognizer 140 associated with the type of the document 118 (e.g., a recognizer 140 associated with a 1099-INT document 118) may have recognized a first text element (e.g., "$2543.00") in a first portion of the document 118, and the data validation component 132 may have populated the first field 144(1) of the electronic form 212 with the recognized first text element (e.g., "$2543.00"). Similarly, the document type-specific recognizer 140 may have recognized a second text element (e.g., "$254.30") in a second portion of the document 118 and a third text element (e.g., "$363.25") in a third portion of the document 118, and the data validation component 132 may have populated the second field 144(2) of the electronic form 212 with the recognized second text element (e.g., "$254.30") and the third field 144(3) of the electronic form 212 with the recognized third text element (e.g., "363.25").

In some examples, the user 102 may manually enter text into at least some of the fields 144. For instance, when the user interface 200D is displayed, one or more of the fields 144 may be empty, in some examples. This may be the case when the document recognizer component 130 is unable to recognize particular text elements included in a particular type of document 118, at least for purposes of auto-populating the text elements into a corresponding electronic form 212. In these examples, the user 102 may still be navigated directed to the user interface 200D, but one or more of the fields 144 may be empty such that the user 102 is to enter text manually into the empty fields 144.

FIG. 2D shows a first image 142(1) presented below the first field 144(1). However, as noted above, images 142, such as the first image 142(1), may be presented adjacent to a corresponding field 144 in various ways, such as below the field 144, above the field 144, to the left of the field 144, to the right of the field 144, or any combination thereof (e.g., along a diagonal). Additionally, images 142, such as the first image 142(1), may be presented in the user interface 200D persistently and without user action. For example, upon displaying the user interface 200D, the first image 142(1) may be presented adjacent to the first field 144(1) without the user 102 providing any user input. In this example, additional images 142 may also be presented adjacent to the other fields 144, such as the second field 144(2), the third field 144(3), and so on. In other words, in some examples, a plurality of images 142 may be concurrently displayed adjacent to respective fields 144, and the images 142 may be displayed persistently (or permanently) while the user interface 200D is displayed.

In the example of FIG. 2D, images 142 are not presented (e.g., the images 142 are hidden, minimized, or the like) unless and until the user 102 provides user input via the user interface 200D to cause an individual image(s) 142 to be presented. For example, the user interface 200D may present a first interactive element 146(1) adjacent to (e.g., to the right of) the first field 144(1), and the user 102 may interact with (e.g., select) the first interactive element 146(1) to cause the first image 142(1) to be presented (e.g., as a pop-up, a modal, etc.) adjacent to the first field 144(1). In some examples, an additional, subsequent selection of the first interactive element 146(1) may cause the first image 146(1) to disappear from the user interface 200D, or may cause the first image 146(1) to be minimized or otherwise displayed inconspicuously. That is, the user 102 may be able to toggle the first image 142(1) between being presented and being hidden or minimized. In some examples, additional fields around (e.g., below) the first field 144(1) may move dynamically (e.g., shift downwards) in response to the user 102 interacting with the first interactive element 146(1), which causes the user interface 200D to present the first image 142(1) adjacent to the first field 144(1). In other words, the user interface 200D may be modified dynamically by shifting user interface elements (e.g., fields, buttons, etc.) to make room for the first image 142(1) when the user 102 requests display of the first image 142(1), such as by interacting with (e.g., selecting) the first interactive element 146(1). Although not shown in FIG. 2D, the user 102 may interact with the additional interactive elements 146(2), 146(3), etc., to cause respective images 142 to be presented adjacent to the corresponding fields 144(2), 144(3), etc. In some examples, the first image 142(1) is not displayed concurrently with other images 142 in the user interface 200D. In some examples, the first image 142(1) is configured to be displayed concurrently with other images 142 in the user interface 200D, such as when the user 102 interacts with (e.g., selects) one or more additional interactive elements 146(2), 146(3), etc. In some examples, interaction with an additional interactive element 146, such as the second interactive element 146(2), causes the first image 142(1) to be hidden or minimized.

The images 142 may represent respective portions of the document 118 in question. For example, the first image 142(1) is an image of a first portion of the document 118; in this case, a first portion of a 1099-INT form associated with the user 102. In the particular example of FIG. 2D, the first portion of the document 118 came from Box 1 of the 1099-INT form. The first image 142(1) may have been generated based at least in part on coordinates of a bounding box around the text element "$2,543.00." For example, the document recognizer component 130 and/or a particular document type-specific recognizer 140 may have determined coordinates (e.g., pixel coordinates) of a bounding box around the recognized text element "$2,543.00" in the document 118 (e.g., the 1099-INT form), and the bounding box coordinates may have been utilized to generate the first image 142(1) of the first portion of the document 118 that include the recognized text element "$2,543.00," such as by "zooming in" on the coordinates of the bounding box. In this example, the data validation component 132 may have retrieved the first image 142(1) from the data store 114 and caused the first image 142(1) to be presented via the user interface 200D in response to an interaction with the first interactive element 146(1). In this manner, as the user 102 reviews the text elements that have been populated in the fields 144 of the electronic form 212, the user 102 is able to quickly validate the text elements (e.g., by confirming that the text elements correspond to the source text in the images 142) without averting their gaze from the user interface 200D to validate that the text that has been recognized from the document image data 116 representing the document 118. Even in the case where the user 102 manually entered the text into the fields 144, the availability of the images 142 adjacent to the respective fields is a convenient way of validating that the user 102 has entered the text correctly.

In the example of FIG. 2D, the user interface 200D further presents at least one interactive element 148 (e.g., a "continue" button) that, upon selection, indicates that the user 102 validates the text element(s) within the field(s) 144. That is, if the user 102 confirms that the text elements populated in the fields 144 match the corresponding source text in the images 142 (e.g., the first image 142(1)), the user 102 may validate the text elements populated in the fields 144 by selecting the interactive element 148 in the example of FIG. 2D. The example of FIG. 2D is an example of a single interactive element 148 that is usable for implicitly validating multiple text elements populated in multiple respective fields 144. The user interface 200D of FIG. 2D is an example of a confirmational data validation experience (e.g., a confirmational tax experience) that may be provided to the user 102, where the user 102 confirms (e.g., by selecting the interactive element 148) that the text elements populated in the fields 144 are correct (e.g., the correct values, such as numerical values).

FIG. 2E is an example user interface 200E presenting an interactive element(s) 214, 216 in association with a field 144(2) populated with a recognized text element for contextual validation of the recognized text element in the field 144(2), according to an implementation of the present subject matter. FIG. 2E is an example of a user interface 200E that allows the user 102 to explicitly validate a text element in each field 144 of the electronic form 212. For example, in response to an interaction with (e.g., selection of) the second interactive element 146(2) presented adjacent to the second field 144(2), the second image 142(2) may be presented adjacent to (e.g., below) the second field 144(2), and the interactive elements 214 and 216 may also be presented via the user interface 200E in association with the second field 144(2) (e.g., below the second image 142(2)). In the example of FIG. 2E, the interactive element 214 (e.g., a "correct" button) may be interacted with (e.g., selected) to indicate that the user 102 validates the text element (e.g., "$254.30") within the second field 144(2). However, an interaction with the interactive element 214 does not necessarily indicate that the user 102 validates other text elements within additional fields 144 presented via the user interface 200E. In other words, the interactive element 214 may be for exclusively validating the text element within the associated field 144(2), but not other text elements. In the example of FIG. 2E, the interactive element 216 (e.g., an "incorrect" button) may be interacted with (e.g., selected) to indicate that the user 102 has determined that the text element within the second field 144(2) is incorrect. Accordingly, with an image 142 presented adjacent to a populated field 144 of the electronic form 212, the user 102 can select "correct" 214 or "incorrect" 216 to validate or invalidate the text element in the field 144, as the case may be.

In some examples, after validating text within a field 144 by interacting with (e.g., selecting) the interactive element 214 (e.g., a "correct" button), the corresponding interactive element 146 may be converted into a visual indicator 218 that indicates that the user 102 has reviewed (e.g., validated) the text element within the corresponding field 144, much like a checklist that indicates what the user 102 has reviewed and has not yet reviewed. An example of this is shown with the visual indicator 218 presented adjacent to the first field 144(1). In this example, the user 102 may have validated the text element (e.g., "$2543.00") in the first field 144(1) by selecting an interactive element 214 presented in association with the first field 144(1) (not shown in FIG. 2E), and after doing so, the first interactive element 146(1) depicted in FIG. 2D may be converted into the visual indicator 218 depicted in FIG. 2E to indicate that the user 102 has validated the text element (e.g., "2543.00") in the first field 144(1). The user interface 200E of FIG. 2E is yet another example of a confirmational data validation experience (e.g., a confirmational tax experience) that may be provided to the user 102, where the user 102 confirms, by selecting an interactive element 214 or 216 associated with each field 144 in the electronic form 212, that the corresponding text element is correct (e.g., the correct value, such as a numerical value). In the example of FIG. 2E, the user interface 200E further includes the interactive element 148. In some examples, the interactive element 148 is not interactive until the user 102 has validated the text element in each field 144 of the electronic form 212, and the element 148 becomes interactive after the last text element has been validated. In other words, the user 102 may be prevented from continuing to the next screen until the user 102 has validated each text element in each field 144 of the electronic form 212.

In the user interfaces 200D and 200E, the user 102 may be able to edit the text elements within the fields 144. This may be the case even when the text elements are auto-populated in the fields 144. Thus, in some examples, if the user 102 determines that a text element from a document 118 has been recognized incorrectly, the user 102 can quickly edit the text element within the field to correct the text element. The availability of the images 142 adjacent to the respective fields 144 may aid the user in editing the text elements in the fields 144. For example, the first image 142(1) may be presented via the user interface 200D while the user 102 edits the text element in the first field 144(1). In this way, the user 102 can look at the first image 142(1) while editing the text element within the first field 144(1) without having to avert their gaze from the user interface 200D. Similarly, the second image 142(2) may be presented via the user interface 200E while the user 102 edits the text element in the second field 144(2). In this way, the user 102 can look at the second image 142(2) while editing the text element within the second field 144(2) without having to avert their gaze from the user interface 200E.

FIG. 2F is an example user interface 200F that prompts a user 102 to submit another type(s) of document 118 (e.g., another type of tax document(s)) associated with a group of users identified using a machine learning model(s) 128, according to an implementation of the present subject matter. Consider the running example where the service computing platform 110 received document image data 116 representing a document 118, and type of the document 118 was determined to be a 1099-INT form. In this example, a trained machine learning model(s) 128 may be used to determine, based at least in part on the type of the document 118, a group of users (e.g., a group of users who have submitted 1099-INT forms as part of their respective tax interview processes). Accordingly, the service computing platform 110 (e.g., via the data validation component 132) may cause the application 106 executing on the electronic device 104 of the user to prompt the user 102 to submit another type of document associated with the determined group of users. An example of this prompt is shown in FIG. 2F where the user 102 is prompted for a 1099-DIV form via the user interface 200F. The user interface 200F may further present an interactive element 220 (e.g., a "Yes" button) and an interactive element 222 (e.g., a "No" button) for the user 102 to indicate whether they have the particular type of document 118. It may be the case, for example, that the user 102 forgot to submit one of their tax forms, and the prompting for the additional type(s) of document(s) 118 can help ensure that a user's tax filing is thorough and complete. Accordingly, the user 102 can be reminded to submit all necessary documents for filing their taxes in a thorough and complete manner.

The user interfaces 134 and 200A-200F are provided as examples of user interfaces that can be presented to facilitate techniques described herein. User interfaces can present additional or alternative data in additional or alternative configurations. That is, user interfaces 134 and 200A-200F should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
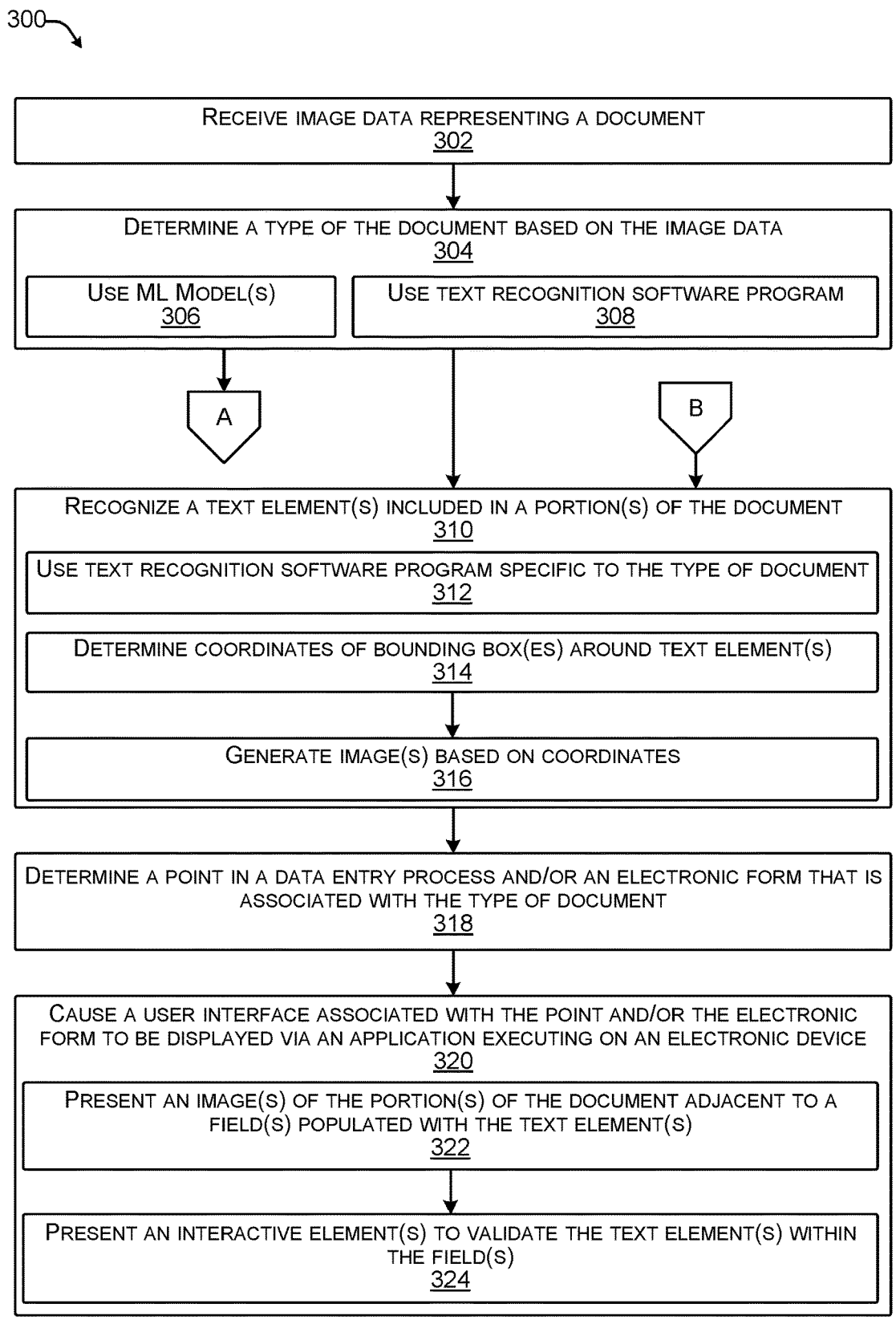
FIG. 3 is an example process for causing display of a user interface for contextual validation of recognized text, according to an implementation of the present subject matter.

FIG. 3 is an example process 300 for causing display of a user interface for contextual validation of recognized text, according to an implementation of the present subject matter. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 300. The process 300 can be implemented by a system including one or more processors and memory storing computer-executable instructions to cause the one or more processors to perform the process 300. In some examples, the process 300 can be implemented by a processing device(s) (e.g., server(s)) of the service computing platform 110). For discussion purposes, the process 300 is described with reference to the previous figures.

At 302, image data 116 representing a document 118 is received. In some examples, a service computing platform 110 associated with a service 108 (e.g., a server computing device(s) and/or a processor(s) thereof) may receive the image data 116 at block 302. In some examples, the image data 116 is received from the electronic device 104 and represents an image of the document 118 captured via an image capturing device (e.g., a camera(s)) on the electronic device 104 of a user 102 with whom the document 118 is associated. For example, a user 102 may use a camera(s) of the electronic device 104 to capture an image(s), video(s), or other content representative of the document 118, and the user 102 may submit the image(s) of the document 118 (or video(s), or other content representative of the document 118) as part of a request to recognize the document 118, and/or the request may be sent automatically, without user intervention, upon capturing the image(s), video(s), or other content representative of the document 118, causing the electronic device 104 and/or the application 106 to transmit the document image data 116 to the service computing platform 110 over the network(s) 112, and the service computing platform 110 to receive the document image data 116 at block 302. In another example, the user 102 may use a document scanner (e.g., a flatbed scanner) to digitize the document 118 as image data 116, and the service computing platform 110 may receive such image data 116 at block 302. In yet another example, the user 102 may receive the image data 116 representing an electronic version of the document 118 via email or a similar messaging channel, and the user 102 may upload the image data 116 (e.g., using the application 106, a web browser, etc.). In some examples, image data 116 is received at block 302 via an API(s) 126. For example, a third-party service 122 may utilize the API(s) 126 to provide document image data 116 to the service computing platform 110, and/or the service computing platform 110 may utilize the API(s) 126 to request document image data 116 from the third-party service 122, whereby the document image data 116 is received by the service computing platform 110 at block 302. The image data 116 received at block 302 may represent any suitable file format including, but not limited to, JPEG format, GIF, PNG format, TIFF, PDF, or any other suitable format. Accordingly, the image data 116 received at block 302 may represent a file corresponding to the document 118, which can be received in one or more packets over the network(s) 112 at block 302.

At 304, a type of the document 118 is determined based at least in part on the image data 116 received at block 302. In some examples, the service computing platform 110 may determine the type of the document 118 at block 304. In some examples, the image data 116 is analyzed to determine the type of the document 118 at block 304. In some examples, the image data 116 is analyzed at block 304 using at least one of image recognition, text recognition, or machine learning.

At 306, in some examples, a trained machine learning model(s) 128 is used to determine the type of the document 118. For example, the image data 116 received at block 302, and/or a signal(s) that is/are generated based on the image data 116, may be provided as input to the trained machine learning model(s) 128, and the model(s) 128 may output a classification of the document 118 as one of multiple class labels. That is, determining the type of the document 118 comprises classifying the document 118 using a machine learning mechanism. In a tax example, the classification of the document 118 at block 306 may be one of a W2, a 1099-INT, a 1099-DIV, a 1099-B, a 1099-G, and so on. In some examples, the type of the document 118 is mapped to at least one of the electronic form 212 or a user interface (e.g., user interface 200D, 200E). In some examples, the image data 116 received at block 302 is first image data, and the trained machine learning model(s) 128 is used at block 306 to improve the quality of the first image data 116 for purposes of determining the type of the document 118 at block 304. For example, based at least in part on the first image data 116, and using a trained machine learning model(s) 128, second image data may be generated, wherein the second image data is of higher quality than the first image data 116, where quality is measurable in any suitable metric(s), such as resolution, contrast, brightness, dynamic range, etc. In turn, the second image data of higher quality can be processed using a text recognition software program (e.g., an OCR program) to determine the type of the document 118 at block 304.

At 308, in some examples, a text recognition software program (e.g., an OCR program) is used to determine the type of the document 118, with or without the use of a trained machine learning model(s) 128. For example, the text recognition software program may process the image data 116 received at block 302 to obtain text of the document 118, and the text may be analyzed to identify predefined strings for determining the type of the document 118. In a tax example, the predefined strings may include, but are not limited to, "W2," "1099-INT," "1099-DIV," "1099-B," "1099-G," or the like. Accordingly, at block 308, a document recognizer component 130 of the service computing platform 110 may search the text of the document 118, and if a predefined string (e.g., the string "1099-INT") is identified in the text, the document 118 is classified in accordance with the identified string (e.g., the document 118 may be classified as a 1099-INT form) at block 308. In some examples, the document recognizer component 130 may perform a location-based search of the text of the document 118 at block 308 to determine the type of the document 118. For instance, the document recognizer component 130 may locate a particular box and/or a box within predefined coordinates of the image of the document 118, and if a predefined string (e.g., the string "1099-INT") is included in the located box, the document 118 is classified in accordance with the string at block 308.

At 310, a text element(s) included in a portion(s) of the document 118 is/are recognized or identified. In some examples, the service computing platform 110 may recognize or identify the text element(s) at block 310. In some examples, the text element(s) is/are recognized at block 310 based on the type of the document 118 determined at block 304. At 312, in some examples, a text recognition software program that is associated with the type of the document 118 (e.g., a document type-specific recognizer 140, such as an OCR program specific to the type of the document 118) is used to recognize the text element(s). For example, the document recognizer component 130 may be configured to utilize one of a plurality of different text recognition software programs 140(1)-140(N) at block 312 to recognize the text element(s), each text recognition software program 140 being associated with a particular type of document. In some examples, such a document type-specific recognizer 140 may utilize a specific template that corresponds to the particular type of the document 118 determined at block 304 to perform text recognition for recognizing text elements of interest (e.g., a subset of text elements included in the document 118 that are to be validated and/or input in a data input and/or validation process). In some examples, the text recognition software program 140 used at block 312 may be tailored to recognize text elements that are to be populated into fields of an electronic form 212 that corresponds to the type of the document 118 determined at block 304. In this example, some text elements included in the document 118 may be ignored at block 312.

At 314, in some examples, coordinates of a bounding box(es) around the text element(s) are determined, and, at 316, an image(s) 142 is/are generated based at least in part on the coordinates. In some examples, the document recognizer component 130 and/or the particular document type-specific recognizer 140 used at block 312 may be configured to determine the bounding box coordinates at block 314. In some examples, such bounding box coordinates may be returned in metadata with the recognized text element at block 314. In some examples, the bounding box coordinates determined at block 314 are pixel coordinates that define a location(s) and a size(s) of the bounding box(es), such as by defining a top-left corner of an individual bounding box as (X1, Y1) and a bottom-right corner of the individual bounding box as (X2, Y2), where X1, X2, Y1, and Y2 represent a number of pixels from an origin location in the image of the document 118 in X and Y directions, respectively. At 316, the bounding box coordinates determined at block 314 may be utilized to generate one or more images of portions of the document 118 that include the recognized text element(s), such as by "zooming in" on the coordinates of an individual bounding box to generate an image 142. Such images may be stored in the data store 114, in some examples. It is to be appreciated that the operations described at blocks 312-316 may be performed for any number of text element(s) included in the document 118.

At 318, a point (e.g., a step) in a data input and/or validation process that is associated with the type of the document 118 is determined and/or an electronic form 212 that is associated with the type of the document 118 is determined. In some examples, the service computing platform 110 may determine the point and/or the electronic form 212 at block 318. In some examples, determining the point and/or the electronic form 212 at block 318 is based on the type of the document 118 determined at block 304. In some examples, determining the electronic form 212 includes determining an electronic form 212 that is to be populated with the text element(s) recognized at block 310. In some examples, determining the electronic form 212 includes determining a point in the data input and/or validation process where the electronic form 212 is to be populated with the text element(s) recognized at block 310. In some examples, the data input and/or validation process may involve the user 102 progressing through a series of user interfaces that correspond to respective points (e.g., steps) in the data input and/or validation process. Accordingly, the point (e.g., the step) determined at block 318 may have a user interface (e.g., user interface 200D, 200E) associated therewith for receiving information associated with the electronic form 212. In some examples, the data input and/or validation process is, or corresponds to, an interview process (e.g., a tax interview process or a tax filing process) conducted via an application 106 executing on an electronic device 104 of the user 102. According, the point (e.g., the step) determined at block 318 can be a point (e.g., a step) in an interview process with which the electronic form 212 is associated, the step having a user interface (e.g., user interface 200D, 200E) associated therewith for receiving information associated with the electronic form 212.

At 320, a user interface 200D, 200E associated with the point and/or the electronic form 212 is caused to be displayed via the application 106 executing on the electronic device 104 associated with the user 102. In some examples, the service computing platform 110 may cause the user interface 200D, 200E to be displayed at block 320. In some examples, the user interface 200D, 200E is part of a series of user interfaces associated with the data input and/or validation process (e.g., the interview process), and the user interface 200D, 200E is caused to be displayed at block 320 based on determining the point (e.g., the step) at block 318 without causing one or more user interfaces that precede the user interface 200D, 200E in the series of user interfaces to be displayed via the application 106 prior to the user interface 200D, 200E being displayed. In other words, the user 102 may be navigated directly to the user interface 200D, 200E without having to progress through one or more user interfaces leading up to the user interface 200D, 200E.

At 322, the user interface 200D, 200E presents an image(s) 142 of at least the portion(s) of the document 118 adjacent to a field(s) 144 (e.g., a field(s) 144 of the electronic form 212) populated with the text element(s) recognized at block 310. For example, if multiple text element(s) are recognized at block 310, the user interface 200D, 200E may present a first image 142(1) of at least a first portion of the document 118 adjacent to a first field 144(1) populated with a first text element recognized at block 310, a second image 142(2) of at least a second portion of the document 118 adjacent to a second field 144(2) populated with a second text element recognized at block 310, and so on for any number of text elements populated into a corresponding number of fields 144. In some examples, the image(s) 142 can be presented "directly adjacent" to the field(s) 144 populated with the text element(s) such that no user interface elements are presented between the image 142 and the field 144. In some examples, the text element in the field 144 is larger than other text elements in the user interface 200D, 200E, so as to improve the readability of the text element, to highlight or feature the text element, and/or to otherwise make the text element salient in the user interface 200D, 200E. In some examples, this may involve enlarging a size of the text element and/or enlarging a size of the field 144 in the user interface 200D, 200E, such as by "magnifying" the text element and/or the field 144. In some examples, the field(s) 144 is/are automatically populated with the text element(s) recognized at block 310, without user intervention. In some examples, particular fields 144 may be empty and the user 102 populates the empty fields 144 with text. As described herein, the image(s) 142 may be presented persistently (or permanently) while the user interface 200D, 200E is displayed at block 320, and without user action. However, in some examples, the user 102 may provide user input via the user interface 200D, 200E to display or hide individual ones of the images 142. For example, the user interface 200D, 200E may present one or more interactive elements 146 adjacent to respective field 144, and the user 102 may interact with (e.g., select) the interactive element(s) 146 to cause the image(s) 142 to be presented at block 322 (e.g., as a pop-up, a modal, etc.) adjacent to the corresponding field 144. For instance, the user interface 200D, 200E may present a first interactive element 146(1) adjacent to a first field 144(1), the first interactive element 146(1), upon selection, causing a first image 142(1) to be presented adjacent to the first field 144(1) at block 322. In the case of multiple displayable images 142, a second interactive element 146(2) may be presented in the user interface 200D, 200E adjacent to a second field 144(2), the second interactive element 146(2), upon selection, causing a second image 142(2) to be presented adjacent to the second field 144(2), and so on for any suitable number of images 142.

In some examples, the image(s) 142 of at least the portion(s) of the document 118 may be hidden initially, and may be presented at block 322 in response to any suitable type of user input, such as changing the orientation of the electronic device 104, scrolling up, down, left, and/or right in the user interface 200D, 200E, or the like. In some examples, the image(s) 142 of at least the portion(s) of the document 118 may be presented at block 322 based on a form factor of the electronic device 104, a type of the electronic device 104, a version of an operating system of the electronic device 104, and/or a type of software program displaying the user interface 200D, 200E. For example, the image(s) 142 may be persistently presented in a web-based user interface (e.g., displayed via a web browser), and the image(s) 142 may be selectively presented in an application-based user interface, or vice versa.

At 324, the user interface 200D, 200E presents at least one interactive element that, upon selection, indicates that a user 102 of the electronic device 104 validates the text element(s) within the field(s) 144. In one example, an interactive element 148 is presented at block 324, and selection of the interactive element 148 indicates that the user 102 validates the text element(s) within the field(s) 144. In other words, a single interactive element 148 may be presented at block 324 for validating potentially multiple text elements in multiple corresponding fields 144 (e.g., via a single selection). This wholistic validation may be a quick and convenient way for the user 102 to validate text with fewer "clicks". In other examples, an interactive element(s) 214, 216 may be presented at block 324 in association with a particular field 144, and with a selection of the interactive element 214 or 216, the user 102 can indicate that the text element within the particular field 144 is validated (e.g., correct text has been populated in the field 144). In this example, selection of the interactive element 214 or 216 does not indicate that the user 102 validates other text elements in other fields 144 presented via the user interface 200D, 200E. Accordingly, the interactive element(s) presented at block 324 can allow the user 102 to validate text elements one-by-one, or as a batch.

Figure 4:
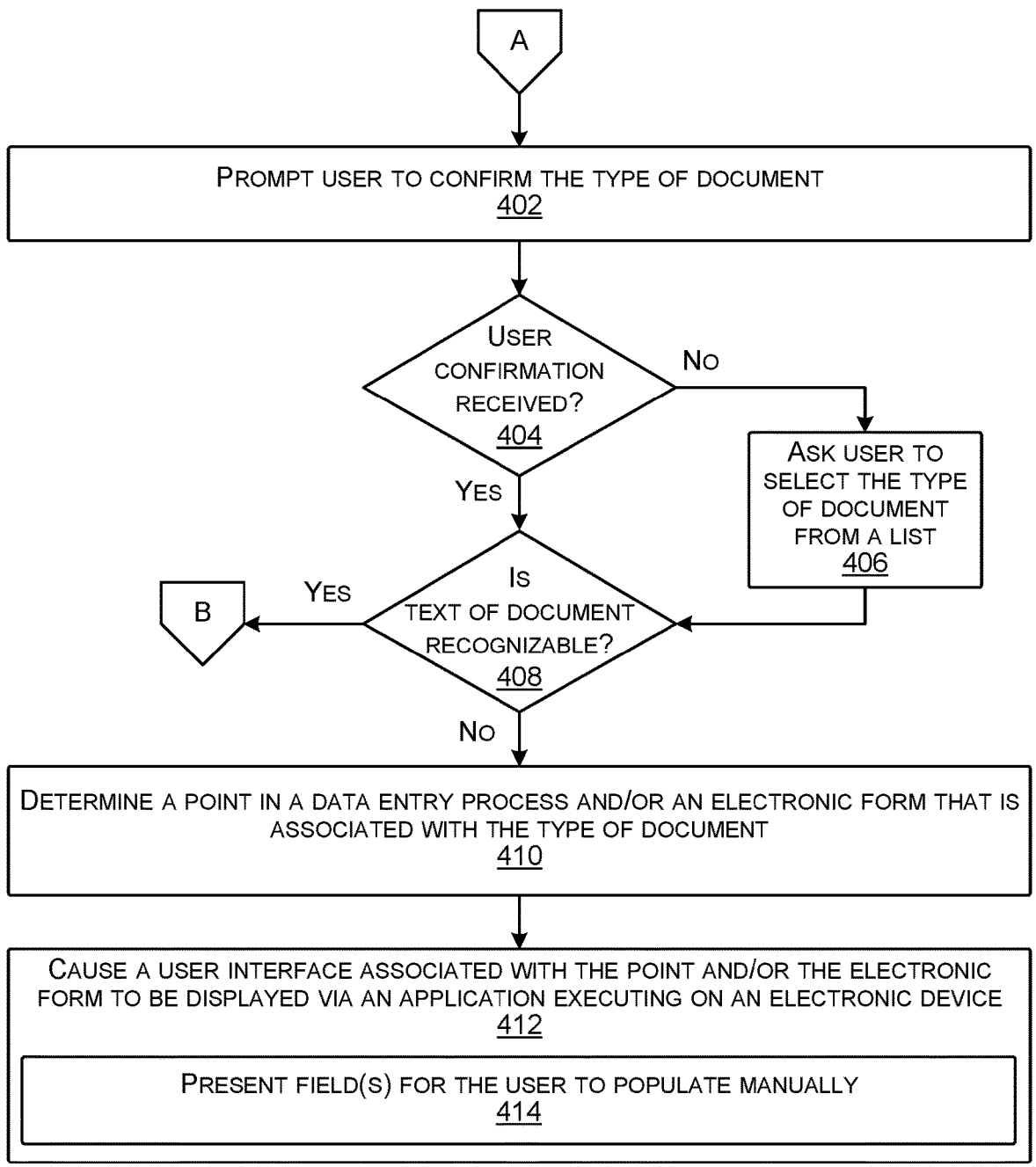
FIG. 4 is an example process for assisting a user with an application-based data entry process based on a recognized type of document, according to an implementation of the present subject matter.

FIG. 4 is an example process 400 assisting a user 102 with an application-based data entry process based on a recognized type of document 118, according to an implementation of the present subject matter. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 400. The process 400 can be implemented by a system including one or more processors and memory storing computer-executable instructions to cause the one or more processors to perform the process 400. In some examples, the process 400 can be implemented by a processing device(s) (e.g., server(s)) of the service computing platform 110). For discussion purposes, the process 400 is described with reference to the previous figures.

As indicated by the off-page reference "A" in FIGS. 3 and 4, the process 400 may pick up from block 304 of the process 300 after a type of the document 118 has been determined. At 402, a user 102 is prompted to confirm the type of the document 118 determined at block 304. In some examples, the service computing platform 110 may cause the application 106 executing on the electronic device 104 of the user 102 to prompt the user 102 at block 402. An example of prompting the user 102 in this manner is shown in FIG. 2B.

At 404, a determination is made as to whether user confirmation of the type of the document 118 has been received. This determination may be made at block 404 based at least in part on receiving an indication of an interaction with (e.g., a selection of) an interactive element 204 or 206 presented via a user interface 200B that prompted the user 102 at block 402. If it is determined, at block 404, that user confirmation of the type of the document 118 has not been received, the process 400 may follow the NO route from block 404 to block 406, where the user 102 may be asked to select the type of the document 118 from a list. For example, if the user 102 selects the interactive element 206 (e.g., a "No" button) via the user interface 200B, the application 106 may cause the user interface 200B (or another user interface) to present a list of other types of documents 118, and the user 102 may select a different type of document 118 from the list. If it is determined, at block 404, that user confirmation of the type of the document 118 has been received (e.g., following the YES route from block 404), or following block 406, the process 400 may proceed to block 408.

At 408, a determination is made as to whether text of the document 118 is recognizable. For example, the document recognizer component 130 may include document type-specific recognizers 140(1)-(N) for certain types of documents 118, but not other types of documents. If the document recognizer component 130 has a document type-specific recognizer 140 for the type of document 118 in question, the process 400 may follow the YES route from block 408 to block 310 of the process 300, as indicated via the off-page reference "B" in FIGS. 3 and 4. If the document recognizer component 130 does not have a document type-specific recognizer 140 for the type of document 118 in question, or if the text of the document is not recognizable for any other reason (e.g., the image data 116 is not of high enough quality to recognize the text), the process 400 may follow the NO route from block 408 to block 410.

At 410, a point in a data input and/or validation process that is associated with the type of the document 118 is determined and/or an electronic form 212 that is associated with the type of the document 118 is determined. In some examples, the service computing platform 110 may determine the point and/or the electronic form 212 at block 410. In some examples, determining the point and/or the electronic form 212 at block 410 is based on the type of the document 118 determined at block 304. In some examples, determining the electronic form 212 includes determining an electronic form 212 that is to be populated with text from the document 118 in question. In some examples, determining the electronic form 212 includes determining a point in the data input and/or validation process where the electronic form 212 is to be populated with text from the document 118 in question. In some examples, the data input and/or validation process may involve the user 102 progressing through a series of user interfaces that correspond to respective points in the data input and/or validation process. In some examples, the data input and/or validation process is, or corresponds to, a tax interview process or a tax filing process conducted via an application 106 executing on an electronic device 104 of the user 102

At 412, a user interface 200D, 200E associated with the point and/or the electronic form 212 is caused to be displayed via the application 106 executing on the electronic device 104 associated with the user 102. In some examples, the service computing platform 110 may cause the user interface 200D, 200E to be displayed at block 412. In some examples, the user interface 200D, 200E is caused to be displayed at block 412 in response to determining the point at block 410 without causing one or more user interfaces that precede the user interface 200D, 200E in the series of user interfaces to be displayed via the application 106 prior to the user interface 200D, 200E being displayed. In other words, the user 102 may be navigated directly to the user interface 200D, 200E without having to progress through one or more user interfaces leading up to the user interface 200D, 200E.

At 414, the user interface 200D, 200E presents a field(s) 144 (e.g., a field(s) 144 of the electronic form 212) for the user 102 to populate with text manually. Accordingly, in the case where text of the document 118 cannot be recognized and the user 102 is to populate fields 144 with text from the document 118 manually, user convenience is improved, as compared to existing technologies, by navigating the user 102 directly to the point in the data input and/or validation process and/or directly to the electronic form 212 that is to be populated with the text from the document 118 such that the user 102 does not have to progress through one or more user interfaces preceding (or leading up to) the user interface 200D, 200E presented at block 412.

Figure 5:
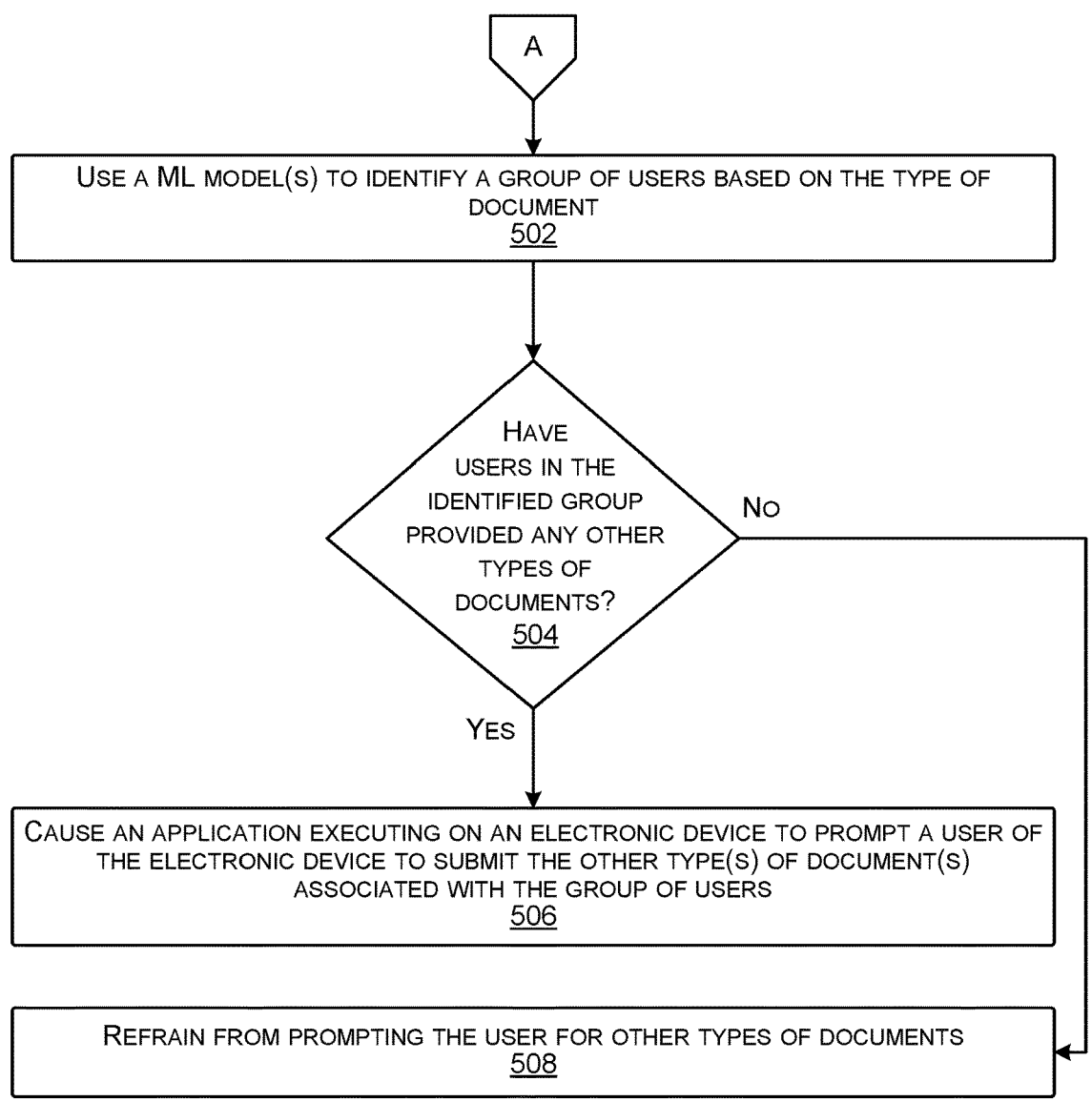
FIG. 5 is an example process for prompting a user to submit another type(s) of document(s) associated with a group of users identified using a machine learning model(s), according to an implementation of the present subject matter.

FIG. 5 is an example process 500 for prompting a user 102 to submit another type(s) of document(s) associated with a group of users identified using a machine learning model(s) 128, according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a processing device(s) (e.g., server(s)) of the service computing platform 110). For discussion purposes, the process 500 is described with reference to the previous figures.

As indicated by the off-page reference "A" in FIGS. 3 and 5, the process 500 may pick up from block 304 of the process 300 after a type of the document 118 has been determined. At 502, a group of users is determined based at least in part on the type of the document 118 and using a trained machine learning model(s) 128. In some examples, the service computing platform 110 may determine the group of users at block 502. For example, the trained machine learning model(s) 128 may receive, as input, data representing the type of the document 118, and may determine, as output, a group of users, such as users who have submitted the type of the document 118 in association with a data input and/or validation process (e.g., a tax interview process).

At 504, a determination is made as to whether users in the identified group of users have provided another type(s) of document(s) 118, such as in association with the data input and/or validation process. In some examples, the service computing platform 110 may make the determination at block 504. If it is determined, at block 504, that users in the identified group of users have provided another type(s) of document 118, the process 500 may follow the YES route from block 504 to block 506.

At 506, an application 106 executing on an electronic device of a user 102 may be caused to prompt the user 102 to submit the other type(s) of document(s) 118 associated with the group of users. An example of this prompt is shown in FIG. 2F where the user 102 is prompted for a 1099-DIV form via the user interface 200F. It may be the case, for example, that the user 102 forgot to submit one of their tax forms, and the prompting for the additional type(s) of document(s) 118 at block 506 can help ensure that a user's tax filing is thorough and complete. If it is determined, at block 504, that users in the identified group of users have not provided another type(s) of document 118, the process 500 may follow the NO route from block 504 to block 508, where the service computing platform 110 and/or the application 106 executing on the user's electronic device 104 may refrain from prompting the user 102 for other types of documents.

Figure 6:
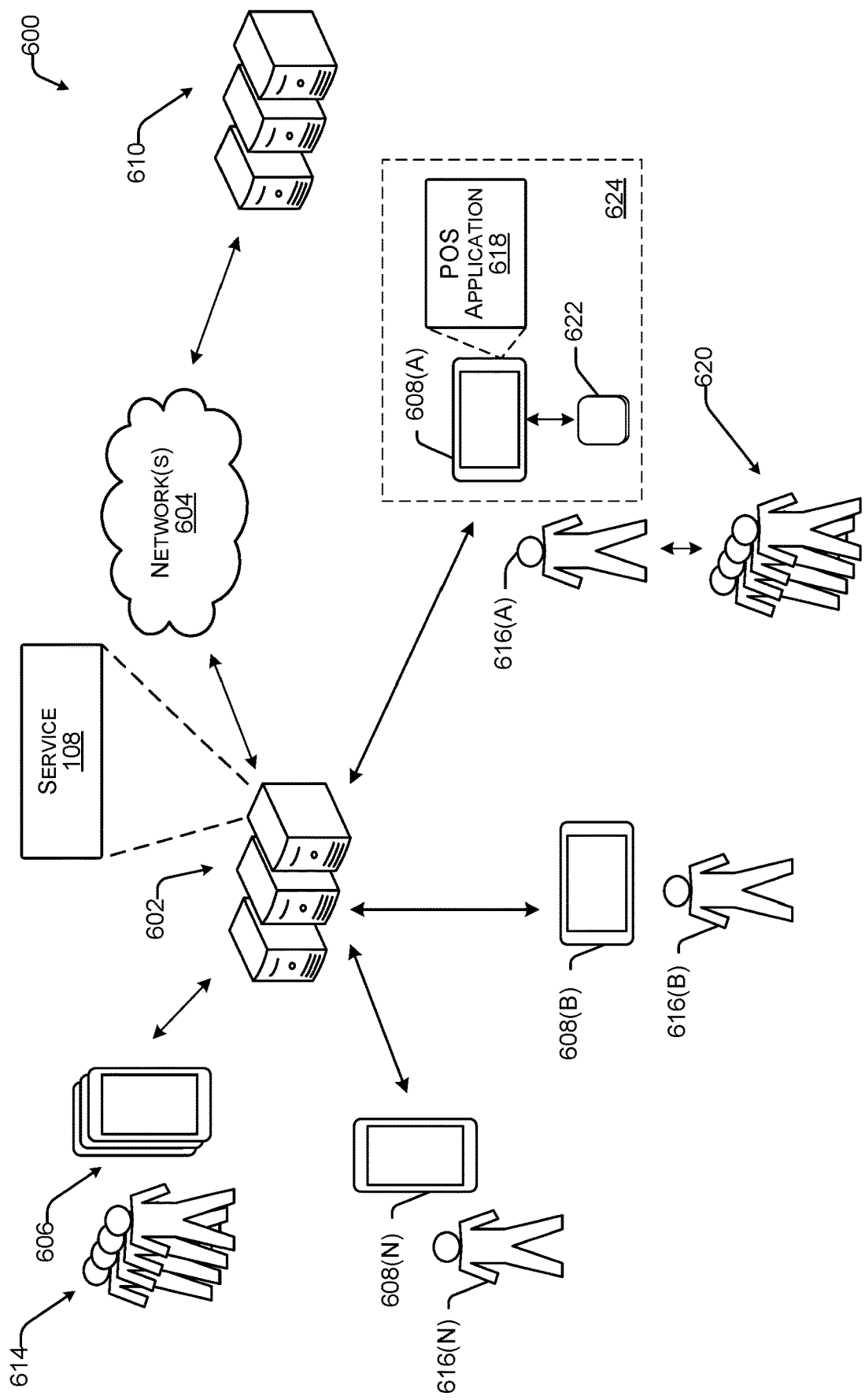
FIG. 6 is an example environment for performing techniques described herein.

FIG. 6 is an example environment 600 for performing techniques described herein. The environment 600 includes server(s) 602 that can communicate over a network 604 with user devices 606 (which, in some examples can be merchant devices 608 (individually, 608(A)-608(N))) and/or server(s) 610 associated with third-party service provider(s). The server(s) 602 can be associated with a service provider that can provide one or more services for the benefit of users 614, as described below. Actions attributed to the service provider can be performed by the server(s) 602.

For example, the server(s) 602 may be the same as or similar to the service computing platform 110 and/or the processing device(s) (e.g., server(s)) introduced in FIG. 1, and the server(s) 602 may implement the service 108, which may include the trained machine learning model(s) 128, the document recognizer component 130, and/or the data validation component 132, as described herein. Furthermore, the network(s) 604 may be the same as or similar to the network(s) 112 introduced in FIG. 1.

The environment 600 can include a plurality of user devices 606, as described above. Each one of the plurality of user devices 606 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 606 (and in some examples, the merchant devices 608) may be the same as or similar to the electronic device 104 introduced in FIG. 1. In some examples, individual ones of the user devices can be operable by users 614. The users 614 can be referred to as customers, buyers, merchants, sellers, borrowers, employees, employers, payors, payees, couriers and so on. The users 614 can interact with the user devices 606 via user interfaces presented via the user devices 606. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 606 can have an instance or versioned instance of an application, which can be downloaded from an application store, for example, which can present the user interface(s) described herein. In at least one example, a user 614 can interact with the user interface via touch input, spoken input, or any other type of input.

As described above, in at least one example, the users 614 can include merchants 616 (individually, 616(A)-616(N)). The users 614 (and in some examples, the merchants 616) may be the same as or similar to the user 102 introduced in FIG. 1. In an example, the merchants 616 can operate respective merchant devices 608, which can be user devices 606 configured for use by merchants 616. For the purpose of this discussion, a "merchant" can be any entity that offers items (e.g., goods or services) for purchase or other means of acquisition (e.g., rent, borrow, barter, etc.). The merchants 616 can offer items for purchase or other means of acquisition via brick-and-mortar stores, mobile stores (e.g., pop-up shops, food trucks, etc.), online stores, combinations of the foregoing, and so forth. In some examples, at least some of the merchants 616 can be associated with a same entity but can have different merchant locations and/or can have franchise/franchisee relationships. In additional or alternative examples, the merchants 616 can be different merchants. That is, in at least one example, the merchant 616(A) is a different merchant than the merchant 616(B) and/or the merchant 616(C).

In accordance with the examples described herein, the server(s) 602 may be configured to implement a user interface(s) for contextual validation of recognized text. For instance, the server(s) 602 may receive image data 116 representing a document 118, determine, based at least in part on the image data 116, a type of the document 118, recognize a text element(s) included in a portion(s) of the document 118, and determine a point in a data input and/or validation process that is associated with the type of the document 118 and/or determine an electronic form 212 that is associated with the type of the document 118. The server(s) 602 may further cause a user interface 200D, 200E (e.g., a user interface 200D, 200E associated with the point) to be displayed via an application 106 executing on an electronic device 606, wherein the user interface 200D, 200E presents: (i) an image(s) 142 of the portion(s) of the document 118 adjacent to a field(s) 144 (e.g., a field(s) 144 of the electronic form 212) populated with the text element(s); and (ii) at least one interactive element (e.g., interactive element 148, interactive element 214, etc.) that, upon selection, indicates that a user 102 of the electronic device 606 validates the text element(s) within the field(s) 144.

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 608 can have an instance of a POS application 618 stored thereon. In some examples, the POS application 618 may be the same as or similar to the application 106 introduced in FIG. 1. The POS application 618 can configure the merchant device 608 as a POS terminal, which enables the merchant 616(A) to interact with one or more customers 620. As described above, the users 614 can include customers, such as the customers 620 shown as interacting with the merchant 616(A). For the purpose of this discussion, a "customer" can be any entity that acquires items from merchants. While only two customers 620 are illustrated in FIG. 6, any number of customers 620 can interact with the merchants 616. Further, while FIG. 6 illustrates the customers 620 interacting with the merchant 616(A), the customers 620 can interact with any of the merchants 616.

In at least one example, interactions between the customers 620 and the merchants 616 that involve the exchange of funds (from the customers 620) for items (from the merchants 616) can be referred to as "transactions." In at least one example, the POS application 618 can determine transaction data associated with the POS transactions. Transaction data can include payment information, which can be obtained from a reader device 622 associated with the merchant device 608(A), user authentication data, purchase amount information, point-of-purchase information (e.g., item(s) purchased, date of purchase, time of purchase, etc.), etc. The POS application 618 can send transaction data to the server(s) 602 such that the server(s) 602 can track transactions of the customers 620, merchants 616, and/or any of the users 614 over time. Furthermore, the POS application 618 can present a UI to enable the merchant 616(A) to interact with the POS application 618 and/or the service provider via the POS application 618.

In at least one example, the merchant device 608(A) can be a special-purpose computing device configured as a POS terminal (via the execution of the POS application 618). In at least one example, the POS terminal may be connected to a reader device 622, which is capable of accepting a variety of payment instruments, such as credit cards, debit cards, gift cards, short-range communication based payment instruments, and the like, as described below. In at least one example, the reader device 622 can plug in to a port in the merchant device 608(A), such as a microphone port, a headphone port, an audio-jack, a data port, or other suitable port. In additional or alternative examples, the reader device 622 can be coupled to the merchant device 608(A) via another wired or wireless connection, such as via a Bluetooth®, BLE, and so on. Additional details are described below with reference to FIG. 9. In some examples, the reader device 622 can read information from alternative payment instruments including, but not limited to, wristbands and the like.

In some examples, the reader device 622 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 622, and communicate with the server(s) 602, which can provide, among other services, a payment processing service. The server(s) 602 associated with the service provider can communicate with server(s) 610, as described below. In this manner, the POS terminal and reader device 622 may collectively process transaction(s)

between the merchants 616 and customers 620. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 622 of the POS system 624 are shown as separate devices, in additional or alternative examples, the POS terminal and the reader device 622 can be part of a single device. In some examples, the reader device 622 can have a display integrated therein for presenting information to the customers 620. In additional or alternative examples, the POS terminal can have a display integrated therein for presenting information to the customers 620. POS systems, such as the POS system 624, may be mobile, such that POS terminals and reader devices may process transactions in disparate locations across the world. POS systems can be used for processing card-present transactions and card-not-present (CNP) transactions, as described below.

A card-present transaction is a transaction where both a customer 620 and his or her payment instrument are physically present at the time of the transaction. Card-present transactions may be processed by swipes, dips, taps, or any other interaction between a physical payment instrument (e.g., a card), or otherwise present payment instrument, and a reader device 622 whereby the reader device 622 is able to obtain payment data from the payment instrument. A swipe is a card-present transaction where a customer 620 slides a card, or other payment instrument, having a magnetic strip through a reader device 622 that captures payment data contained in the magnetic strip. A dip is a card-present transaction where a customer 620 inserts a payment instrument having an embedded microchip (i.e., chip) into a reader device 622 first. The dipped payment instrument remains in the payment reader until the reader device 622 prompts the customer 620 to remove the card, or other payment instrument. While the payment instrument is in the reader device 622, the microchip can create a one-time code which is sent from the POS system 624 to the server(s) 610 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 620 may tap or hover his or her payment instrument (e.g., card, electronic device such as a smart phone running a payment application, etc.) over a reader device 622 to complete a transaction via short-range communication (e.g., NFC, RFID, Bluetooth®, BLE, etc.). Short-range communication enables the payment instrument to exchange information with the reader device 622. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 624, the server(s) 602, and/or the server(s) 610 may exchange payment information and transaction data to determine whether transactions are authorized. For example, the POS system 624 may provide encrypted payment data, user authentication data, purchase amount information, point-of-purchase information, etc. (collectively, transaction data) to server(s) 602 over the network(s) 604. The server(s) 602 may send the transaction data to the server(s) 610. As described above, in at least one example, the server(s) 610 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 610 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 610 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 610 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 610 associated therewith), and a payment authorization message is communicated from the issuer to the POS device via a path opposite of that described above, or via an alternate path.

As described above, the server(s) 610, which can be associated with payment service provider(s), may determine whether the transaction is authorized based on the transaction data, as well as information relating to parties to the transaction (e.g., the customer 620 and/or the merchant 616(A)). The server(s) 610 may send an authorization notification over the network(s) 604 to the server(s) 602, which may send the authorization notification to the POS system 624 over the network(s) 604 to indicate whether the transaction is authorized. The server(s) 602 may also transmit additional information such as transaction identifiers to the POS system 624. In one example, the server(s) 602 may include a merchant application and/or other functional components for communicating with the POS system 624 and/or the server(s) 610 to authorize or decline transactions.

Based on the authentication notification that is received by the POS system 624 from server(s) 602, the merchant 616(A) may indicate to the customer 620 whether the transaction has been approved. In some examples, approval may be indicated at the POS system 624, for example, at a display of the POS system 624. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 614 can access all of the services of the service provider. In other examples, the users 614 can have gradated access to the services, which can be based on risk tolerance, IDV outputs, subscriptions, and so on. In at least one example, access to such services can be availed to the merchants 616 via the POS application 618. In additional or alternative examples, each service can be associated with its own access point (e.g., application, web browser, etc.).

The service provider can offer payment processing services for processing payments on behalf of the merchants 616, as described above. For example, the service provider can provision payment processing software, payment processing hardware and/or payment processing services to merchants 616, as described above, to enable the merchants 616 to receive payments from the customers 620 when conducting POS transactions with the customers 620. For instance, the service provider can enable the merchants 616 to receive cash payments, payment card payments, and/or electronic payments from customers 620 for POS transactions and the service provider can process transactions on behalf of the merchants 616.

As the service provider processes transactions on behalf of the merchants 616, the service provider can maintain accounts or balances for the merchants 616 in one or more ledgers. For example, the service provider can analyze transaction data received for a transaction to determine an amount of funds owed to a merchant 616(A) for the transaction. In at least one example, such an amount can be a total purchase price less fees charged by the service provider for providing the payment processing services. Based on determining the amount of funds owed to the merchant 616(A), the service provider can deposit funds into an account of the merchant 616(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 616(A) to a bank account of the merchant 616(A) that is held at a bank or other financial institution (e.g., associated with the server(s) 610). Scheduled deposits can occur at a prearranged time after a POS transaction is funded, which can be a business day after the POS transaction occurred, or sooner or later. In some examples, the merchant 616(A) can access funds prior to a scheduled deposit. For instance, the merchant 616(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 616(A) can have a payment instrument that is linked to the stored balance that enables the merchant to access the funds without first transferring the funds from the account managed by the service provider to the bank account of the merchant 616(A).

In at least one example, the service provider may provide inventory management services. That is, the service provider may provide inventory tracking and reporting. Inventory management services may enable the merchant 616(A) to access and manage a database storing data associated with a quantity of each item that the merchant 616(A) has available (i.e., an inventory). Furthermore, in at least one example, the service provider can provide catalog management services to enable the merchant 616(A) to maintain a catalog, which can be a database storing data associated with items that the merchant 616(A) has available for acquisition (i.e., catalog management services). In at least one example, the catalog may include a plurality of data items and a data item of the plurality of data items may represent an item that the merchant 616(A) has available for acquisition. The service provider can offer recommendations related to pricing of the items, placement of items on the catalog, and multi-party fulfilment of the inventory.

In at least one example, the service provider can provide business banking services, which allow the merchant 616(A) to track deposits (from payment processing and/or other sources of funds) into an account of the merchant 616(A), payroll payments from the account (e.g., payments to employees of the merchant 616(A)), payments to other merchants (e.g., business-to-business) directly from the account or from a linked debit card, withdrawals made via scheduled deposit and/or instant deposit, etc. Furthermore, the business banking services can enable the merchant 616(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 616 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 616. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

In some examples, the service provider can offer financing services to users of the data input and/or validation service described herein. In some examples, in the context of a tax preparation interview process, the service provider can offer financing services based at least in part on predictions of incoming funds, for instance, from a tax refund. In some examples, the service provider can monitor, in real-time, predicted tax refunds and received refunds and can use a comparison between predicted and received refunds for training or retraining machine learning models. As such, so long as an accuracy metric between received refunds and predicted refunds stays within a threshold, predicted refunds can be used for advancing funds or otherwise providing financing to users. In some examples, the amount of the predicted refund can be the amount financed. In some examples, the amount of the predicted refund can be an input, with other lending features, used to determine an amount to finance to a user.

The service provider can provide web-development services, which enable users 614 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 616. In at least one example, the service provider can recommend and/or generate content items to supplement omni-channel presences of the merchants 616. That is, if a merchant of the merchants 616 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 614 to set schedules for scheduling appointments and/or users 614 to schedule appointments.

In some examples, the service provider can provide restaurant management services to enable users 614 to make and/or manage reservations, to monitor front-of-house and/or back-of-house operations, and so on. In such examples, the merchant device(s) 608 and/or server(s) 602 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 614 who can travel between locations to perform services for a requesting user 614 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 606.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 614, voice inputs into a virtual assistant or the like, to determine intents of user(s) 614. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 614 may be new to the service provider such that the user 614 that has not registered (e.g., subscribed to receive access to one or more services offered by the service provider) with the service provider. The service provider can offer onboarding services for registering a potential user 614 with the service provider. In some examples, onboarding can involve presenting various questions, prompts, and the like to a potential user 614 to obtain information that can be used to generate a profile for the potential user 614. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 614 providing all necessary information, the potential user 614 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 610). That is, the service provider can offer IDV services to verify the identity of users 614 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 614 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 610 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 602) and/or the server(s) 610 via the network(s) 604. In some examples, the merchant device(s) 608 are not capable of connecting with the service provider (e.g., the server(s) 602) and/or the server(s) 610, due to a network connectivity issue, for example. In additional or alternative examples, the server(s) 602 are not capable of communicating with the server(s) 610 due to network connectivity issue, for example. In such examples, devices may operate in "offline" mode where at least some payment data is stored (e.g., on the merchant device(s) 608) and/or the server(s) 602 until connectivity is restored and the payment data can be transmitted to the server(s) 602 and/or the server(s) 610 for processing.

In at least one example, the service provider can be associated with a hub, such as an order hub, an inventory hub, a fulfillment hub and so on, which can enable integration with one or more additional service providers (e.g., associated with the additional server(s) 610). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 606 that are in communication with one or more server computing devices 602 of the service provider. That is, techniques described herein are directed to a specific implementation—or, a practical application—of utilizing a distributed system of user devices 606 that are in communication with one or more server computing devices 602 of the service provider to perform a variety of services, as described above. The unconventional configuration of the distributed system described herein enables the server(s) 602 that are remotely-located from end-users (e.g., users 614) to intelligently offer services based on aggregated data associated with the end-users, such as the users 614 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 614 and user devices 606. Furthermore, such features are changed dynamically based on the profiles of the users involved interacting with the GUIs. As such, techniques described herein are directed to improvements to computing systems.

Figure 7:
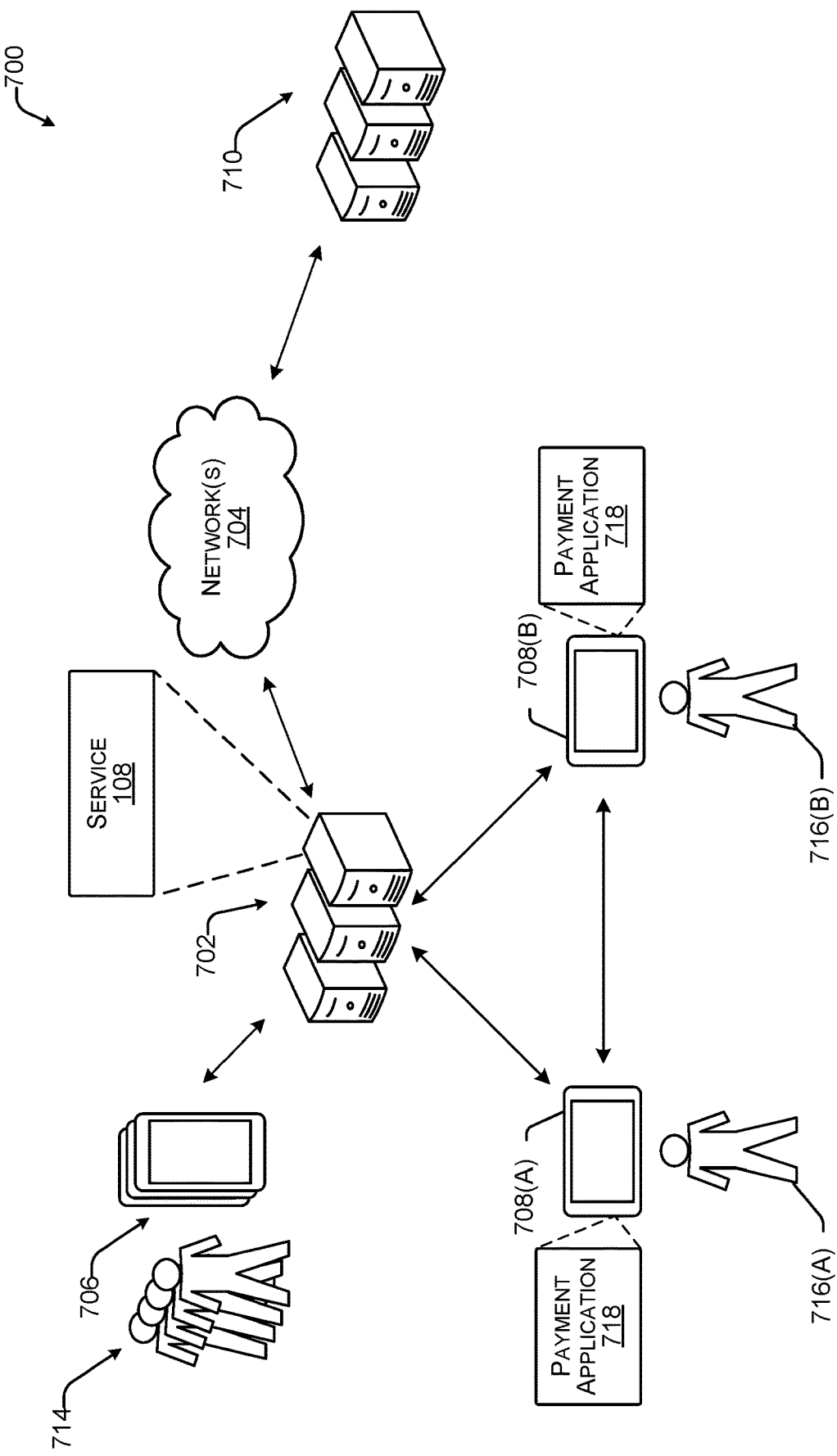
FIG. 7 is an example environment for performing techniques described herein.

FIG. 7 is an example environment 700 for performing techniques described herein. The environment 700 includes server(s) 702 that can communicate over a network 704 with user devices 706 (which, in some examples can be user devices 708 (individually, 708(A), 708(B)) and/or server(s) 710 associated with third-party service provider(s). The server(s) 702 can be associated with a service provider that can provide one or more services for the benefit of users 714, as described below. Actions attributed to the service provider can be performed by the server(s) 702. In some examples, the service provider referenced in FIG. 6 can be the same or different than the service provider referenced in FIG. 7.

For example, the server(s) 702 may be the same as or similar to the payment service computing platform 110 and/or the processing device(s) (e.g., server(s)) introduced in FIG. 1, and the server(s) 702 may implement the service 108, which may include the trained machine learning model(s) 128, the document recognizer component 130, and/or the data validation component 132, as described herein. Furthermore, the network(s) 704 may be the same as or similar to the network(s) 112 introduced in FIG. 1.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The user devices 706 (and in some examples, the user devices 708) may be the same as or similar to the electronic device 104 introduced in FIG. 1. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

In at least one example, the service provider can provide a peer-to-peer payment service that enables peer-to-peer payments between two or more users 714. Two users, user 716(A) and user 716(B) are illustrated in FIG. 7 as "peers" in a peer-to-peer payment. In at least one example, the service provider can communicate with instances of a payment application 718 (or other access point) installed on devices 706 configured for operation by users 714. In an example, an instance of the payment application 718 executing on a first device 708(A) operated by a payor (e.g., user 716(A)) can send a request to the service provider to transfer an asset (e.g., fiat currency, non-fiat currency, cryptocurrency, securities, gift cards, and/or related assets) from the payor to a payee (e.g., user 716(B)) via a peer-to-peer payment. In some examples, assets associated with an account of the payor are transferred to an account of the payee. In some examples, assets can be held at least temporarily in an account of the service provider prior to transferring the assets to the account of the payee. The users 714 (and in some examples, the users 716) may be the same as or similar to the user 102 introduced in FIG. 1, and the payment application 718 may be the same as or similar to the application 106 introduced in FIG. 1.

In accordance with the examples described herein, the server(s) 702 may be configured to implement a user interface(s) for contextual validation of recognized text. For instance, the server(s) 702 may receive image data 116 representing a document 118, determine, based at least in part on the image data 116, a type of the document 118, recognize a text element(s) included in a portion(s) of the document 118, and determine a point in a data input and/or validation process that is associated with the type of the document 118 and/or determine an electronic form 212 that is associated with the type of the document 118. The server(s) 702 may further cause a user interface 200D, 200E (e.g., a user interface 200D, 200E associated with the point) to be displayed via an application 718 executing on an electronic device 706, 708 wherein the user interface 200D, 200E presents: (i) an image(s) 142 of the portion(s) of the document 118 adjacent to a field(s) 144 (e.g., a field(s) 144 of the electronic form 212) populated with the text element(s); and (ii) at least one interactive element (e.g., interactive element 148, interactive element 214, etc.) that, upon selection, indicates that a user 102 of the electronic device 706, 708 validates the text element(s) within the field(s) 144.

In some examples, the service provider can utilize a ledger system to track transfers of assets between users 706. FIG. 8, below, provides additional details associated with such a ledger system. The ledger system can enable users 706 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 718 executing on user device(s) of payee(s). As an example, the service provider can transfer assets from an account of user 716(A) to an account of the user 716(B) and can send a notification to the user device 708(B) of the user 716(B) for presentation via a user interface. The notification can indicate that a transfer is in process, a transfer is complete, or the like. In some examples, the service provider can send additional or alternative information to the instances of the payment application 718 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 702 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 718 executing on the user devices 706. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 7 or a third-party service provider associated with the server(s) 710. In examples where the content provider is a third-party service provider, the server(s) 710 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 7. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 706 (e.g., mobile device or conventional personal computer (PC)) based on instructions transmitted to and from the server(s) 702 (which, in such an example can be called a "messaging server"). In some instances, the messaging application can include a payment application with messaging capability that enables users of the payment application to communicate with one another. In such instances, the payment application can be executed on a user device 706 based on instructions transmitted to and from the server(s) 702 (e.g., the payment service discussed in this description or another payment service that supports payment transactions). In some examples, the messaging application can be provided by a third-party service provider associated with the server(s) 710. In examples where the messaging application is a third-party service provider, the server(s) 710 can be accessible via one or more APIs or other integrations.

As described above, the service provider can facilitate peer-to-peer transactions, which can enable users 706 to transfer fiat currency, non-fiat currency, cryptocurrency, securities, or other assets, or portions thereof, to other users 706. In at least one example, individual users can be associated with user accounts. Additional details associated with user accounts and the transfer of assets between users 706 are described below with reference to FIG. 8.

Furthermore, the service provider of FIG. 7 can enable users 706 to perform banking transactions via instances of the payment application 718. For example, users can configure direct deposits or other deposits for adding assets to their various ledgers/balances. Further, users 706 can configure bill pay, recurring payments, and/or the like using assets associated with their accounts. In addition to sending and/or receiving assets via peer-to-peer transactions, users 706 buy and/or sell assets via asset networks such as cryptocurrency networks, securities networks, and/or the like.

FIG. 8 is an example data store 800 used for performing techniques described herein. The data store(s) 800 can be associated with the server(s) 702. The data store(s) 800 may be the same as or similar to the data store(s) 114 introduced in FIG. 1.

In at least one example, the data store(s) 800 can store assets in an asset storage 802, as well as data in user account(s) 804, merchant account(s) 806, and/or customer account(s) 808. In at least one example, the asset storage 802 can be used to store assets managed by the service provider of FIG. 7. In at least one example, the asset storage 802 can be used to record whether individual of the assets are registered to users. For example, the asset storage 802 can include an asset wallet 810 for storing records of assets owned by the service provider of FIG. 7, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 710 can be associated therewith. In some examples, the asset wallet 810 can communication with the asset network via one or more components associated with the server(s) 702.

The asset wallet 810 can be associated with one or more addresses and can vary addresses used to acquire assets (e.g., from the asset network(s)) so that its holdings are represented under a variety of addresses on the asset network. In examples where the service provider of FIG. 7 has its own holdings of cryptocurrency (e.g., in the asset wallet 810), a user can acquire cryptocurrency directly from the service provider of FIG. 7. In some examples, the service provider of FIG. 7 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 802 may contain ledgers that store records of assignments of assets to users 706. Specifically, the asset storage 802 may include asset ledger 810, fiat currency ledger 814, and other ledger(s) 816, which can be used to record transfers of assets between users 706 of the service provider and/or one or more third-parties (e.g., merchant network(s), payment card network(s), ACH network(s), equities network(s), the asset network, securities networks, etc.). In doing so, the asset storage 802 can maintain a running balance of assets managed by the service provider of FIG. 7. The ledger(s) of the asset storage 802 can further indicate some of the running balance for each of the ledger(s) stored in the asset storage 802 is assigned or registered to one or more user account(s) 804.

In at least one example, the asset storage 802 can include transaction logs 818, which can include records of past transactions involving the service provider of FIG. 7. In at least one example, transaction data, as described herein, can be stored in association with the transaction logs 818.

In some examples, the data store(s) 800 can store a private blockchain 819. A private blockchain 819 can function to record sender addresses, recipient addresses, public keys, values of cryptocurrency transferred, and/or can be used to verify ownership of cryptocurrency tokens to be transferred. In some examples, the service provider of FIG. 7 can record transactions taking place within the service provider of FIG. 7 involving cryptocurrency until the number of transactions has exceeded a determined limit (e.g., number of transactions, storage space allocation, etc.). Based at least in part on determining that the limit has been reached, the service provider of FIG. 7 can publish the transactions in the private blockchain 819 to a public blockchain (e.g., associated with the asset network), where miners can verify the transactions and record the transactions to blocks on the public blockchain. In at least one example, the service provider of FIG. 7 can participate as miner(s) at least for its transactions to be posted to the public blockchain.

In at least one example, the data store(s) 800 can store and/or manage accounts, such as user account(s) 804, merchant account(s) 806, and/or customer account(s) 808. In at least one example, the user account(s) 804 may store records of user accounts associated with the users 714. In at least one example, the user account(s) 804 can include a user account 8 20, which can be associated with a user (of the users 714). Other user accounts of the user account(s) 804 can be similarly structured to the user account 8 20, according to some examples. In other examples, other user accounts may include more or less data and/or account information than that provided by the user account 8 20. In at least one example, the user account 8 20 can include user account data 828, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 828 can include account activity 8 30 and user wallet key(s) 8 32. The account activity 8 30 may include a transaction log for recording transactions associated with the user account 8 20. In some examples, the user wallet key(s) 832 can include a public-private key-pair and a respective address associated with the asset network or other asset networks. In some examples, the user wallet key(s) 8 32 may include one or more key pairs, which can be unique to the asset network or other asset networks.

In addition to the user account data 828, the user account 820 can include ledger(s) for account(s) managed by the service provider of FIG. 7, for the user. For example, the user account 820 may include an asset ledger 834, a fiat currency ledger 8 36, and/or one or more other ledgers 838. The ledger(s) can indicate that a corresponding user utilizes the service provider of FIG. 7 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 7.

In some examples, the asset ledger 834 can store a balance for each of one or more cryptocurrencies (e.g., Bitcoin, Ethereum, Litecoin, etc.) registered to the user account 8 20. In at least one example, the asset ledger 834 can further record transactions of cryptocurrency assets associated with the user account 820. For example, the user account 820 can receive cryptocurrency from the asset network using the user wallet key(s) 8 32. In some examples, the user wallet key(s) 832 may be generated for the user upon request. User wallet key(s) 832 can be requested by the user in order to send, exchange, or otherwise control the balance of cryptocurrency held by the service provider of FIG. 7 (e.g., in the asset wallet 810) and registered to the user. In some examples, the user wallet key(s) 8 32 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 7 and the value is credited as a balance in asset ledger 834), by purchasing currency in the form associated with the account using currency in a different form (e.g., buying a value of cryptocurrency from the service provider of FIG. 7 using a value of fiat currency reflected in fiat currency ledger, and crediting the value of cryptocurrency in asset ledger 834), or by conducting a transaction with another user (customer or merchant) of the service provider of FIG. 7 wherein the account receives incoming currency (which can be in the form associated with the account or a different form, in which the incoming currency may be converted to the form associated with the account). In some examples, the user account data 828 can include preferences for maintaining balances of individual of the ledgers. For example, the service provider of FIG. 7 can automatically debit the fiat currency ledger 836 to increase the asset ledger 834, or another account associated with the user whenever the cryptocurrency balance (e.g., of the asset ledger 834) falls below a stated level (e.g., a threshold). Conversely, in some embodiments, the service provider of FIG. 7 can automatically credit the fiat currency ledger 836 to decrease the asset ledger 834 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 7 (i.e., an external account). In at least one example, the user can transfer all or a portion of a balance of the cryptocurrency stored in the third-party cryptocurrency wallet to the service provider of FIG. 7. Such a transaction can require the user to transfer an amount of the cryptocurrency in a message signed by user's private key to an address provided by the service provider of FIG. 7. In at least one example, the transaction can be sent to miners to bundle the transaction into a block of transactions and to verify the authenticity of the transactions in the block. Once a miner has verified the block, the block is written to a public, distributed blockchain where the service provider of FIG. 7 can then verify that the transaction has been confirmed and can credit the user's asset ledger 834 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 7. As described above, in some examples, the service provider of FIG. 7 can acquire cryptocurrency from a third-party source (e.g., associated with the third-party server(s) 118). In such examples, the asset wallet 810 can be associated with different addresses and can vary addresses used to acquire cryptocurrency so that its holdings are represented under a variety of addresses on a blockchain. When the service provider of FIG. 7 has their own holdings of cryptocurrency, users can acquire cryptocurrency directly from the service provider of FIG. 7. In some examples, the service provider of FIG. 7 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 7 has its own cryptocurrency assets, cryptocurrency transferred in a transaction (e.g., data with address provided for receipt of transaction and a balance of cryptocurrency transferred in the transaction) can be stored in the asset wallet 810. In at least one example, the service provider of FIG. 7 can credit the asset ledger 834 of the user. Additionally, while the service provider of FIG. 7 recognizes that the user retains the value of the transferred cryptocurrency through crediting the asset ledger 834, any person that inspects the blockchain will see the cryptocurrency as having been transferred to the service provider of FIG. 7. In some examples, the asset wallet 810 can be associated with many different addresses. In such examples, any person that inspects the blockchain may not easily associate all cryptocurrency stored in asset wallet 810 as belonging to the same entity. It is this presence of a private ledger that is used for real-time transactions and maintained by the service provider of FIG. 7, combined with updates to the public ledger at other times, that allows for extremely fast transactions using cryptocurrency to be achieved. In some examples, the "private ledger" can refer to the asset ledger 810, which in some examples, can utilize the private blockchain 819, as described herein. The "public ledger" can correspond to a public blockchain associated with the asset network.

In at least one example, a user's asset ledger 834, fiat currency ledger 836, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 834. In some examples, a user can receive fiat currency or another currency in the form of payment for a transaction with another user. In at least one example, at least a portion of such funds can be converted into cryptocurrency by the service provider of FIG. 7 and used to fund the asset ledger 834 of the user.

As addressed above, in some examples, users can also have other accounts maintained by the service provider of FIG. 7. For example, a user can also have an account in U.S. dollars, which can be tracked, for example, via the fiat currency ledger 836. Such an account can be funded by transferring money from a bank account at a third-party bank to an account maintained by the service provider of FIG. 7 as is conventionally known. In some examples, a user can receive fiat currency in the form of payment for a transaction with another user. In such examples, at least a portion of such funds can be used to fund the fiat currency ledger 836.

In some examples, a user can have one or more internal payment cards registered with the service provider of FIG. 7. Internal payment cards can be linked to one or more of the accounts associated with the user account 820. In some embodiments, options with respect to internal payment cards can be adjusted and managed using an application (e.g., the payment application 718).

In at least one example, as described above, each ledger can correspond to an account of the user that is managed by the service provider of FIG. 7. In at least one example, individual of the accounts can be associated with a wallet or a stored balance for use in payment transactions, peer-to-peer transactions, payroll payments, etc.

In at least one example, the user account 820 can be associated with an asset wallet 840. The asset wallet 840 of the user can be associated with account information that can be stored in the user account data 828 and, in some examples, can be associated with the user wallet key(s) 832. In at least one example, the asset wallet 840 can store data indicating an address provided for receipt of a cryptocurrency transaction. In at least one example, the balance of the asset wallet 840 can be based at least in part on a balance of the asset ledger 834. In at least one example, funds availed via the asset wallet 840 can be stored in the asset wallet 840 or the asset wallet 810. Funds availed via the asset wallet 810 can be tracked via the asset ledger 834. The asset wallet 840, however, can be associated with additional cryptocurrency funds.

In at least one example, when the service provider of FIG. 7 includes a private blockchain 819 for recording and validating cryptocurrency transactions, the asset wallet 840 can be used instead of, or in addition to, the asset ledger 834. For example, at least one example, a merchant can provide the address of the asset wallet 840 for receiving payments. In an example where a customer is paying in cryptocurrency and the customer has their own cryptocurrency wallet account associated with the service provider of FIG. 7, the customer can send a message signed by its private key including its wallet address (i.e., of the customer) and identifying the cryptocurrency and value to be transferred to the merchant's asset wallet 840. The service provider of FIG. 7 can complete the transaction by reducing the cryptocurrency balance in the customer's cryptocurrency wallet and increasing the cryptocurrency balance in the merchant's asset wallet 840. In addition to recording the transaction in the respective cryptocurrency wallets, the transaction can be recorded in the private blockchain 819 and the transaction can be confirmed. A user can perform a similar transaction with cryptocurrency in a peer-to-peer transaction as described above. In at least one example, the cryptocurrency wallet account 830 can be funded by a balance transfer from a third-party cryptocurrency wallet, as described above. Such a transaction can require a user to transfer an amount of cryptocurrency in a message signed by the user's private key to an address of the cryptocurrency wallet account 830. The transferred amount of cryptocurrency can then be within the cryptocurrency wallet account 830 for use in later transactions.

While the asset ledger 834 and/or asset wallet 840 are each described above with reference to cryptocurrency, the asset ledger 834 and/or asset wallet 840 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 7 is an aspect of the technology disclosed that enables technical advantages of increased processing speed and improved security.

Figure 9:
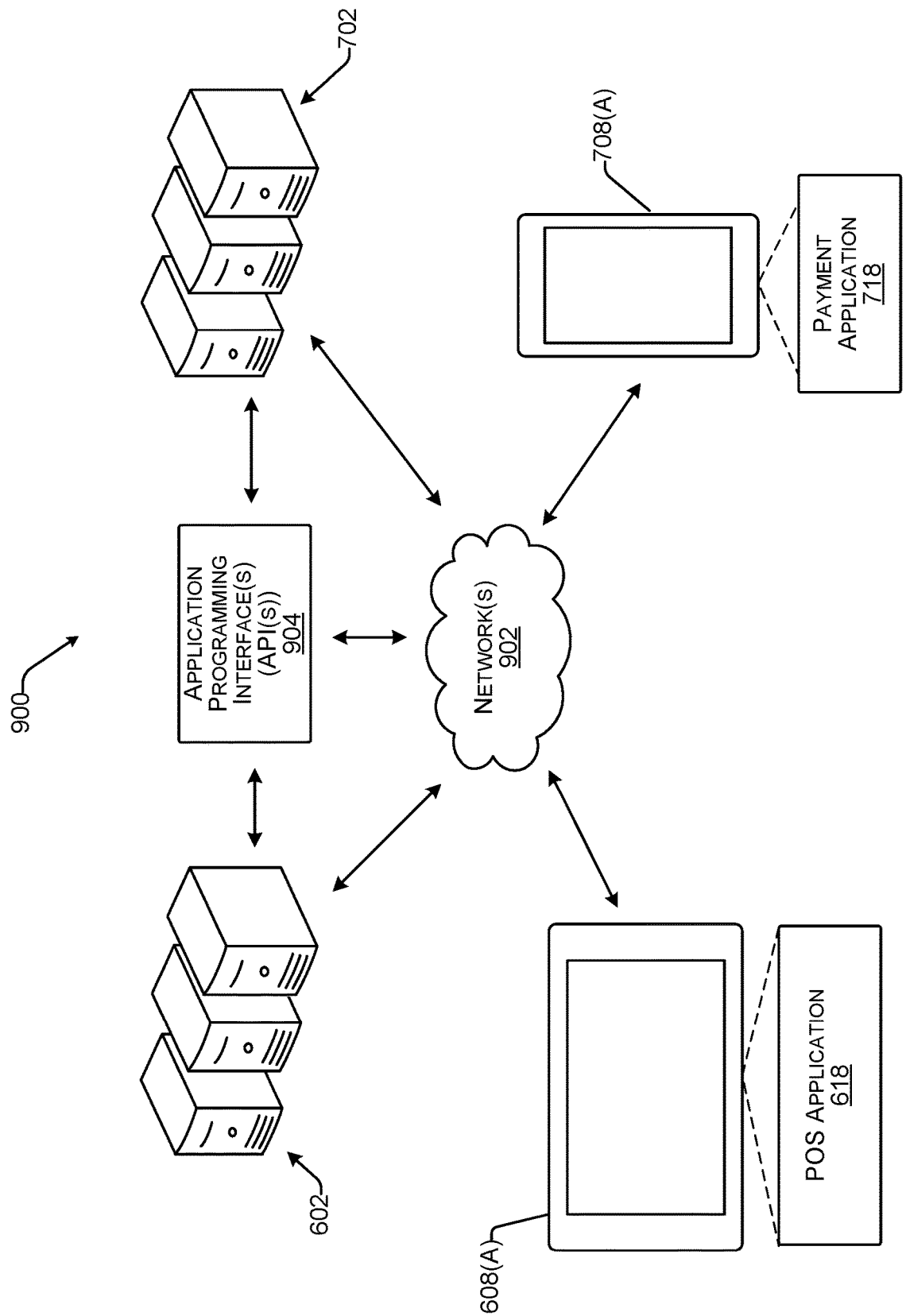
FIG. 9 is an example environment for performing techniques described herein.

FIG. 9 is an example environment 900 for performing techniques described herein. In the environment 900, the environment 600 and the environment 700 can be integrated to enable payments at the point-of-sale using assets associated with user accounts in the peer-to-peer environment of FIG. 7. As illustrated, each of the components can communicate with one another via one or more networks 902. In some examples, one or more APIs 904 or other functional components can be used to facilitate such communication.

In at least one example, the example environment 900 can enable contactless payments, via integration of peer-to-peer payment, or other payment making, platform(s) and payment processing platform(s), are described herein. For the purpose of FIG. 9, the environment 600 can refer to a payment processing platform and the environment 700 can refer to a peer-to-peer payment, or payment making, platform. In an example, such an integration can enable a customer to participate in a transaction via their own computing device instead of interacting with a merchant device of a merchant, such as the merchant device 608(A). In such an example, the POS application 618, associated with a payment processing platform and executable by the merchant device 608(A) of the merchant, can present a QR code, or other code that can be used to identify a transaction (e.g., a transaction code), in association with a transaction between the customer and the merchant. The QR code, or other transaction code, can be provided to the POS application 618 via an API associated with the peer-to-peer payment platform. In an example, the customer can utilize their own computing device, such as the user device 708(A), to capture the QR code, or the other transaction code, and to provide an indication of the captured QR code, or other transaction code, to server(s) 602 and/or server(s) 702.

Based at least in part on the integration of the peer-to-peer payment platform and the payment processing platform (e.g., via the API), the server(s) 602 and/or 702 associated with each can exchange communications with each other— and with a payment application 718 associated with the peer-to-peer payment platform and/or the POS application 618—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 708(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay." by using their computing devices to scan QR codes, or other transaction codes, encoded with data as described herein, to remit payments for transactions. In such a "scan to pay" example, a customer computing device, such as the user device 708(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 618 and the payment application 718, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 708(A), can be specially configured as a buyer-facing device that can enable the customer to view cart building in near real-time, interact with a transaction during cart building using the customer computing dev ice, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 618, associated with a payment processing platform, on the merchant device 608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 608(A) can present a QR code, or other transaction code, that can be associated with a peer-to-peer payment platform. The customer can use a camera associated with the user device 708(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 618, associated with a payment processing platform, on the merchant device 608(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 618 can cause a text message with a resource locator (e.g., uniform resource locator (URL)) that can be associated with a peer-to-peer payment platform to be sent to the user device 708(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 708(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 618 of a merchant device 608(A) at a brick-and-mortar store of a merchant to a payment application 718 of a user device 708(A) of a customer to enable the customer to participate in a transaction via their own computing device. For instance, in a "scan to pay" example as described above, based at least in part on capturing the QR code, or other transaction code, via the user device 708(A), the payment processing platform can provide transaction data to the peer-to-peer payment platform for presentation via the payment application 718 on the user device 708(A). In some examples, the customer can watch items being added to their cart (e.g., via a user interface presented via the payment application). As an item is added to a virtual cart by the merchant—via the POS application 618 on the merchant device 608(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 718 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 708(A) during or after payment of the transaction.

In some examples, based at least in part on capturing the QR code, or other transaction code, the payment processing platform can provide transaction data to the peer-to-peer payment platform for presentation via the payment application 718 on the computing device of the customer, such as the user device 708(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 718 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below-techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 618, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 718 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 10:
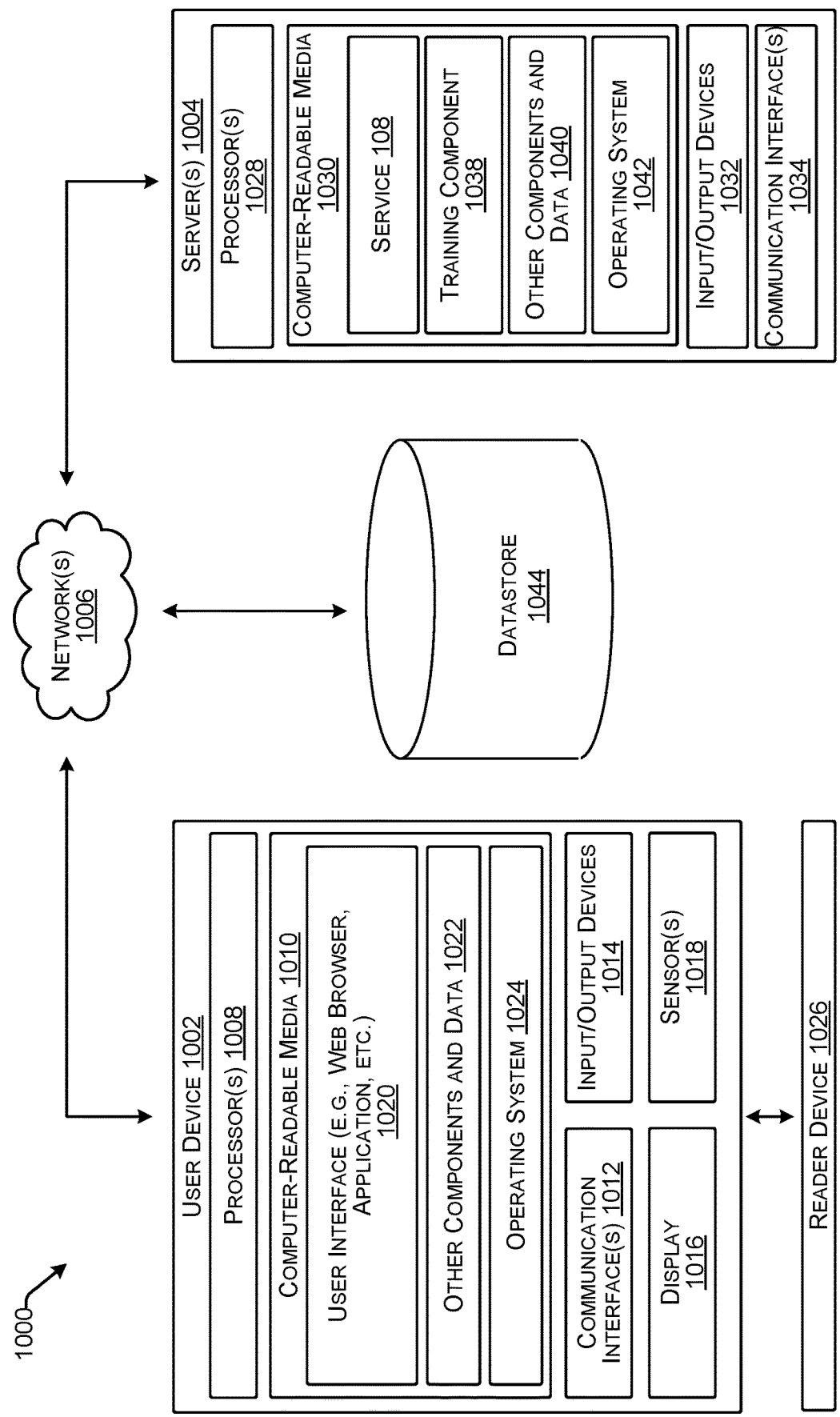
FIG. 10 is an example block diagram illustrating a system for performing techniques described herein.

FIG. 10 is an example block diagram 1000 illustrating a system for performing techniques described herein. The block diagram 1000 illustrates a system 1000 for performing techniques described herein. The system 1000 includes a user device 1002, that communicates with server computing device(s) (e.g., server(s) 1004) via network(s) 1006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1002 is illustrated, in additional or alternate examples, the system 1000 can have multiple user devices, as described above with reference to FIG. 6.

For example, the server(s) 1004 may be the same as or similar to the payment service computing platform 110 and/or the processing device(s) (e.g., server(s)) introduced in FIG. 1, and the server(s) 1004 may implement the service 108, which may include the trained machine learning model(s) 128, the document recognizer component 130, and/or the data validation component 132, as described herein. Furthermore, the network(s) 1006 may be the same as or similar to the network(s) 112 introduced in FIG. 1, and the user device 1002 may be the same as or similar to the electronic device 104 introduced in FIG. 1.

In at least one example, the user device 1002 can be any suitable type of computing device, e.g., portable, semi-portable, semi-stationary, or stationary. Some examples of the user device 1002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1002 can be any computing device capable of sending communications and performing the functions according to the techniques described herein. The user device 1002 can include devices, e.g., payment card readers, or components capable of accepting payments, as described below.

In the illustrated example, the user device 1002 includes one or more processors 1008, one or more computer-readable media 1010, one or more communication interface(s) 1012, one or more input/output (I/O) devices 1014, a display 1016, and sensor(s) 1018.

In at least one example, each processor 1008 can itself comprise one or more processors or processing cores. For example, the processor(s) 1008 can be implemented as one or more microprocessors, microcomputers, microcontrollers, digital signal processors, central processing units, state machines, logic circuitries, and/or any devices that manipulate signals based on operational instructions. In some examples, the processor(s) 1008 can be one or more hardware processors and/or logic circuits of any suitable type specifically programmed or configured to execute the algorithms and processes described herein. The processor(s) 1008 can be configured to fetch and execute computer-readable processor-executable instructions stored in the computer-readable media 1010.

Depending on the configuration of the user device 1002, the computer-readable media 1010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1010 can include, but is not limited to, RAM, ROM, EEPROM, flash memory, solid-state storage, magnetic disk storage, optical storage, and/or other computer-readable media technology. Further, in some examples, the user device 1002 can access external storage, such as RAID storage systems, storage arrays, network attached storage, storage area networks, cloud storage, or any other medium that can be used to store information and that can be accessed by the processor(s) 1008 directly or through another computing device or network. Accordingly, the computer-readable media 1010 can be computer storage media able to store instructions, components or components that can be executed by the processor(s) 1008. Further, when mentioned, non-transitory computer-readable media exclude media such as energy, carrier signals, electromagnetic waves, and signals per se.

The computer-readable media 1010 can be used to store and maintain any number of functional components that are executable by the processor(s) 1008. In some implementations, these functional components comprise instructions or programs that are executable by the processor(s) 1008 and that, when executed, implement operational logic for performing the actions and services attributed above to the user device 1002. Functional components stored in the computer-readable media 1010 can include a user interface 1020 to enable users to interact with the user device 1002, and thus the server(s) 1004 and/or other networked devices. In at least one example, the user interface 1020 can be presented via a web browser, or the like. In other examples, the user interface 1020 can be presented via an application, such as a mobile application or desktop application, which can be provided by a service provider associated with the server(s) 1004, or which can be an otherwise dedicated application. In some examples, the user interface 1020 can be any of the user interfaces 118, 400, and/or 402 described herein. In at least one example, a user can interact with the user interface via touch input, spoken input, gesture, or any other type of input. The word "input" is also used to describe "contextual" input that may not be directly provided by the user via the user interface 1020. For example, user's interactions with the user interface 1020 are analyzed using, e.g., natural language processing techniques, to determine context or intent of the user, which may be treated in a manner similar to "direct" user input.

In accordance with the examples described herein, the server(s) 1004 may be configured to implement a user interface(s) for contextual validation of recognized text. For instance, the server(s) 1004 may receive image data 116 representing a document 118, determine, based at least in part on the image data 116, a type of the document 118, recognize a text element(s) included in a portion(s) of the document 118, and determine a point in a data input and/or validation process that is associated with the type of the document 118 and/or determine an electronic form 212 that is associated with the type of the document 118. The server(s) 1004 may further cause a user interface 1020 (e.g., a user interface associated with the point) to be displayed via an application 106 executing on an electronic device 1002, wherein the user interface 1020 presents: (i) an image(s) 142 of the portion(s) of the document 118 adjacent to a field(s) 144 (e.g., a field(s) 144 of the electronic form 212) populated with the text element(s); and (ii) at least one interactive element (e.g., interactive element 148, interactive element 214, etc.) that, upon selection, indicates that a user 102 of the electronic device 1002 validates the text element(s) within the field(s) 144.

Depending on the type of the user device 1002, the computer-readable media 1010 can also optionally include other functional components and data, such as other components and data 1022, which can include programs, drivers, etc., and the data used or generated by the functional components. In addition, the computer-readable media 1010 can also store data, data structures and the like, that are used by the functional components. Further, the user device 1002 can include many other logical, programmatic and physical components, of which those described are merely examples that are related to the discussion herein.

In at least one example, the computer-readable media 1010 can include additional functional components, such as an operating system 1024 for controlling and managing various functions of the user device 1002 and for enabling basic user interactions.

The communication interface(s) 1012 can include one or more interfaces and hardware components for enabling communication with various other devices, such as over the network(s) 1006 or directly. For example, communication interface(s) 1012 can enable communication through one or more network(s) 1006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1002 can further include one or more input/output (I/O) devices 1014. The I/O devices 1014 can include speakers, a microphone, a camera, and various user controls (e.g., buttons, a joystick, a keyboard, a keypad, etc.), a haptic output device, and so forth. The I/O devices 1014 can also include attachments that leverage the accessories (audio-jack, USB-C, Bluetooth, etc.) to connect with the user device 1002.

In at least one example, user device 1002 can include a display 1016. Depending on the type of computing device(s) used as the user device 1002, the display 1016 can employ any suitable display technology. For example, the display 1016 can be a liquid crystal display, a plasma display, a light emitting diode display, an OLED (organic light-emitting diode) display, an electronic paper display, or any other suitable type of display able to present digital content thereon. In at least one example, the display 1016 can be an augmented reality display, a virtually reality display, or any other display able to present and/or project digital content. In some examples, the display 1016 can have a touch sensor associated with the display 1016 to provide a touchscreen display configured to receive touch inputs for enabling interaction with a graphic interface presented on the display 1016. Accordingly, implementations herein are not limited to any particular display technology. Alternatively, in some examples, the user device 1002 may not include the display 1016, and information can be presented by other means, such as aurally, hapticly, etc.

In addition, the user device 1002 can include sensor(s) 1018. The sensor(s) 1018 can include a GPS device able to indicate location information. Further, the sensor(s) 1018 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 614 and/or for sending users 614 notifications regarding available appointments with merchant(s) located proximate to the users 614. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1002 can include various other components that are not shown, examples of which include removable storage, a power source, such as a battery and power control unit, a barcode scanner, a printer, a cash drawer, and so forth.

In addition, in some examples, the user device 1002 can include, be connectable to, or otherwise be coupled to a reader device 1026, for reading payment instruments and/or identifiers associated with payment objects. In some examples, as described above, the reader device 1026 can plug in to a port in the user device 1002, such as a microphone port, a headphone port, an audio-jack, a data port, or other suitable port. In additional or alternative examples, the reader device 1026 can be coupled to the user device 1002 via another wired or wireless connection, such as via a Bluetooth®, BLE, and so on. The reader device 1026 can include a read head for reading a magnetic strip of a payment card, and further can include encryption technology for encrypting the information read from the magnetic strip. Additionally or alternatively, the reader device 1026 can be an EMV payment reader, which in some examples, can be embedded in the user device 1002. Moreover, numerous other types of readers can be employed with the user device 1002 herein, depending on the type and configuration of the user device 1002.

The reader device 1026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1026 may include hardware implementation, such as slots, magnetic tracks, and rails with one or more sensors or electrical contacts to facilitate detection and acceptance of a payment instrument. That is, the reader device 1026 may include hardware implementations to enable the reader device 1026 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1026 may also include a biometric sensor to receive and process biometric characteristics and process them as payment instruments, given that such biometric characteristics are registered with the payment service system 100 and connected to a financial account with a bank server.

The reader device 1026 may include processing unit(s), computer-readable media, a reader chip, a transaction chip, a timer, a clock, a network interface, a power supply, and so on. The processing unit(s) of the reader device 1026 may execute one or more components and/or processes to cause the reader device 1026 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1026, the computer-readable media may include volatile memory (such as RAM), non-volatile memory (such as ROM, flash memory, miniature hard drive, memory card, or the like), or some combination thereof. In at least one example, the computer-readable media of the reader device 1026 may include at least one component for performing various functions as described herein.

The reader chip may perform functionalities to control the operations and processing of the reader device 1026. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1012, which may provide a clock signal indicating a time. Furthermore, the reader chip may perform functionality to control the network interface, which may interface with the network(s) 1006, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1026. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1002, which can be a POS terminal, and the reader device 1026 are shown as separate devices, in additional or alternative examples, the user device 1002 and the reader device 1026 can be part of a single device, which may be a battery-operated device. In such an example, components of both the user device 1002 and the reader device 1026 may be associated with the single device. In some examples, the reader device 1026 can have a display integrated therewith, which can be in addition to (or as an alternative of) the display 1016 associated with the user device 1002.

The server(s) 1004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1004 can include one or more processors 1028, one or more computer-readable media 1030, one or more I/O devices 1032, and one or more communication interfaces 1034. Each processor 1028 can be a single processing unit or a number of processing units, and can include single or multiple computing units or multiple processing cores. The processor(s) 1028 can be implemented as one or more microprocessors, microcomputers, microcontrollers, digital signal processors, central processing units, state machines, logic circuitries, and/or any devices that manipulate signals based on operational instructions. For example, the processor(s) 1028 can be one or more hardware processors and/or logic circuits of any suitable type specifically programmed or configured to execute the algorithms and processes described herein. The processor(s) 1028 can be configured to fetch and execute computer-readable instructions stored in the computer-readable media 1030, which can program the processor(s) 1028 to perform the functions described herein.

The computer-readable media 1030 can include volatile and nonvolatile memory and/or removable and non-removable media implemented in any type of technology for storage of information, such as computer-readable instructions, data structures, program components, or other data. Such computer-readable media 1030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1004, the computer-readable media 1030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1030 can be used to store any number of functional components that are executable by the processor(s) 1028. In many implementations, these functional components comprise instructions or programs that are executable by the processors 1028 and that, when executed, specifically configure the one or more processors 1028 to perform the actions attributed above to the service provider and/or payment processing service. Functional components stored in the computer-readable media 1030 can optionally include a service 108 (including the sub-components 130 and/or 132, and/or the trained machine learning model 128 depicted in FIG. 1), a training component 1038, and one or more other components and data 1040.

The training component 1038 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1002 and/or the server(s) 1004 for use at a time after the data models have been trained (e.g., at runtime).

The one or more other components and data 1040 can include the sub-components of the payment service 108, the functionality of which is described, at least partially, above. Further, the one or more other components and data 1040 can include a merchant component configured to receive transaction data from POS systems, such as the POS system 624 described above with reference to FIG. 6. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1040 can include programs, drivers, etc., and the data used or generated by the functional components. Further, the server(s) 1004 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1030 can additionally include an operating system 1042 for controlling and managing various functions of the server(s) 1004.

The communication interface(s) 1034 can include one or more interfaces and hardware components for enabling communication with various other devices, such as over the network(s) 1006 or directly. For example, communication interface(s) 1034 can enable communication through one or more network(s) 1006, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1002 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1004 can further be equipped with various I/O devices 1032. Such I/O devices 1032 can include a display, various user interface controls (e.g., buttons, joystick, keyboard, mouse, touch screen, biometric or sensory input devices, etc.), audio speakers, connection ports and so forth.

In at least one example, the system 1000 can include a datastore 1044 that can be configured to store data that is accessible, manageable, and updatable. The data store 1044 may be the same as or similar to the data store(s) 114 introduced in FIG. 1. In some examples, the datastore 1044 can be integrated with the user device 1002 and/or the server(s) 1004. In other examples, as shown in FIG. 10, the datastore 1044 can be located remotely from the server(s) 1004 and can be accessible to the server(s) 1004. The datastore 1044 can comprise multiple databases and/or servers connected locally and/or remotely via the network(s) 1006.

In at least one example, the datastore 1044 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

Moreover, the methods can be combined in whole or in part with each other or with other methods.

What is claimed is:

1. A computer-implemented method comprising:
receiving, by a server computing device, image data representing a document, wherein the image data is captured via an image capturing device on an electronic device of a user with whom the document is associated;
determining, by the server computing device, and by analyzing the image data, a type of the document;
based on the type of the document:
identifying, by the server computing device, a first text element included in a first portion of the document;
determining, by the server computing device, an electronic form that is to be populated with the first text element; and
determining, by the server computing device, a step in an interview process with which the electronic form is associated, the step having a user interface associated therewith for receiving information associated with the electronic form, wherein the user interface is part of a series of user interfaces associated with the interview process; and
causing, by the server computing device and based on determining the step in the interview process with which the electronic form is associated, the user interface to be displayed via an application executing on the electronic device and bypassing one or more other user interfaces that precede the user interface in the series of user interfaces, wherein the user interface presents:
a first image of at least the first portion of the document adjacent to a first field of the electronic form populated with the first text element; and
at least one interactive element that, upon selection, indicates that the user of the electronic device validates the first text element within the first field.

2. The computer-implemented method of claim 1, further comprising:
determining, by the server computing device, first coordinates of a first bounding box around the first text element; and
generating, by the server computing device, the first image based on the first coordinates.

3. The computer-implemented method of claim 1, further comprising analyzing the image data using at least one of image recognition, text recognition, or machine learning.

4. The computer-implemented method of claim 1, wherein the determining of the type of the document comprises classifying the document using a machine learning mechanism, and wherein the type of the document is mapped to at least one of the electronic form or the user interface.

5. The computer-implemented method of claim 1, wherein:
the image data is first image data;
the computer-implemented method further comprises generating, by the server computing device, based at least in part on the first image data and using a trained machine learning model, second image data that is of higher quality than the first image data; and
the determining of the type of the document comprises using a text recognition software program to process the second image data.

6. A system comprising:
one or more processors; and
computer-executable instructions that, when executed by the one or more processors, cause the one or more processors to perform operations comprising:
receiving image data representing a document;
determining, based at least in part on the image data, a type of the document;
recognizing a text element included in a portion of the document;
determining a point in a data validation process where an electronic form that is associated with the type of the document is to be populated with the text element, wherein the data validation process involves progressing through a series of user interfaces; and
in response to the determining of the point, causing a user interface of the series of user interfaces to be displayed via an application executing on an electronic device and bypassing one or more user interfaces that precede the user interface in the series of user interfaces, wherein the user interface presents:
an image of the portion of the document adjacent to a field of the electronic form populated with the text element; and
at least one interactive element that, upon selection, indicates that a user of the electronic device validates the text element within the field.

7. The system of claim 6, wherein the determining of the type of the document comprises:
using a trained machine learning model; or
using a pattern recognition model.

8. The system of claim 6, wherein the data validation process corresponds to a tax interview process conducted via the application.

9. The system of claim 6, the operations further comprising:
determining coordinates of a bounding box around the text element; and
generating the image based at least in part on the coordinates.

10. The system of claim 6, wherein the image of the portion of the document is directly adjacent to the field populated with the text element, and wherein the text element is larger than other text elements in the user interface.

11. The system of claim 6, the operations further comprising recognizing a second text element included in a second portion of the document, wherein the user interface further presents a second image of the second portion of the document adjacent to a second field of the electronic form populated with the second text element, and wherein the at least one interactive element, or another interactive element presented via the user interface, upon selection, indicates that the user validates the second text element within the second field.

12. The system of claim 6, wherein the at least one interactive element:
is presented in association with the field; and
upon selection, indicates that the user validates the text element within the field, but does not indicate that the user validates one or more additional text elements within one or more additional fields of the electronic form presented via the user interface.

13. The system of claim 6, wherein the field is automatically populated with the text element, without user intervention.

14. The system of claim 6, wherein:
the image data is first image data;
the operations further comprise generating, based at least in part on the first image data and using a trained machine learning model, second image data that is of higher quality than the first image data; and
the determining of the type of the document comprises using a text recognition software program to process the second image data.

15. The system of claim 6, the operations further comprising:
determining, based at least in part on the type of the document and using a trained machine learning model, a group of users; and
causing the application to prompt the user to submit a second type of document associated with the group of users.

16. A computer-implemented method comprising:
receiving, by a server computing device, image data representing a document;
determining, by the server computing device, and based at least in part on the image data, a type of the document;
recognizing, by the server computing device, a text element included in a portion of the document;
determining, by the server computing device, a point in a data validation process where an electronic form that is associated with the type of the document is to be populated with the text element, wherein the data validation process involves progressing through a series of user interfaces; and
in response to the determining of the point, causing, by the server computing device, a user interface of the series of user interfaces to be displayed via an application executing on an electronic device and bypassing one or more user interfaces that precede the user interface in the series of user interfaces, wherein the user interface presents:
an image of the portion of the document adjacent to a field of the electronic form populated with the text element; and
at least one interactive element that, upon selection, indicates that a user of the electronic device validates the text element within the field.

17. The computer-implemented method of claim 16, wherein the image of the portion of the document is directly adjacent to the field populated with the text element, and wherein the text element is larger than other text elements in the user interface.

18. The computer-implemented method of claim 16, wherein:
the image data is first image data;
the computer-implemented method further comprises generating, by the server computing device, based at least in part on the first image data and using a trained machine learning model, second image data that is of higher quality than the first image data; and
the determining of the type of the document comprises using a text recognition software program to process the second image data.

19. The computer-implemented method of claim 16, further comprising:
determining, by the server computing device, based at least in part on the type of the document and using a trained machine learning model, a group of users; and
causing, by the server computing device, the application to prompt the user to submit a second type of document associated with the group of users.

20. The computer-implemented method of claim 16, further comprising recognizing, by the server computing device, a second text element included in a second portion of the document, wherein the user interface further presents a second image of the second portion of the document adjacent to a second field of the electronic form populated with the second text element, and wherein the at least one interactive element, upon selection, further indicates that the user validates the second text element within the second field.

\* \* \* \* \*